United States Patent
Sukeda et al.

(10) Patent No.: US 6,681,995 B2
(45) Date of Patent: Jan. 27, 2004

(54) METHOD OF LOADING AN APPLICATION PROGRAM INTO A SMART CARD, SMART CARD, METHOD OF LOADING SCRIPTS INTO A SMART CARD, TERMINAL DEVICE CAPABLE OF OPERATING WITH A SMART CARD, AND STORAGE MEDIUM HOLDING AN APPLICATION PROGRAM

(75) Inventors: Hiroko Sukeda, Tokorozawa (JP); Yusuke Mishina, Kunitachi (JP); Masaru Ohki, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 172 days.

(21) Appl. No.: 09/741,809

(22) Filed: Dec. 22, 2000

(65) Prior Publication Data

US 2001/0006195 A1 Jul. 5, 2001

(30) Foreign Application Priority Data

Dec. 27, 1999 (JP) .......................................... 11-369142

(51) Int. Cl.⁷ .............................................. G06K 19/06
(52) U.S. Cl. ...................... 235/492; 235/375; 235/380; 235/382
(58) Field of Search ................................ 235/492, 375, 235/380, 379, 381, 382, 383; 713/172

(56) References Cited

U.S. PATENT DOCUMENTS 5,404,528 A * 4/1995 Mahajan ..................... 709/320
5,871,398 A * 2/1999 Schneier et al. ............... 463/16
5,912,453 A * 6/1999 Gungl et al. ................. 235/375
6,233,683 B1 * 5/2001 Chan et al. .................. 713/172
6,250,557 B1 * 6/2001 Forslund et al. ............. 235/375
6,256,690 B1 * 7/2001 Carper ........................ 235/492
6,317,832 B1 * 11/2001 Everett et al. ............... 713/172
6,390,374 B1 * 5/2002 Carper et al. ................ 235/492
6,402,028 B1 * 6/2002 Graham et al. .............. 235/380
6,480,959 B1 * 11/2002 Granger et al. ............. 713/189

* cited by examiner

Primary Examiner—Michael G. Lee
Assistant Examiner—Steven S. Paik
(74) Attorney, Agent, or Firm—Antonelli, Terry, Stout & Kraus, LLP

(57) ABSTRACT

A method enables loading/unloading of a plurality of types of games as part of an application program, typically, a game application program installed on a smart card system with a high ability to store information for which highly-reliable security is achievable, extending the range of use of the card. Of a Program to run on the card, the processing parts that can be executed in common are packaged as modules and game definitions described in scripts are loaded/unloaded into/from the card as required from a terminal operating with the card. In the program, a script interpreter that interprets and executes scripts, a controller that controls the loading/unloading of scripts, a controller that performs the management of point data and rights to play a game are provided, whereby dynamic loading/unloading of types of games is possible and one application can offer a plurality of types of games that can be selectively executed.

16 Claims, 20 Drawing Sheets

FIG. 12

※ array[]: work array (305)
   cmd[] : command parameter (306)
   rsp[] : response parameter (307)

[store data]
| | |
|---|---|
| set (a, b) | Store value b into array[a] |
| random (a, b) | Generate a random number (0 to b) and store it into array[a] |
| getcmd (a, b) | Store value of cmd[b] into array[a] |
| setrspa (a, b) | Store the contents of array[a] into rsp[b] |
| setrspv (a, b) | Store value a into rsp[b] |
| getcmda (a, b) | Store the contents of array[(cmd[b])] into array[a] |

[addition/subtraction and compare]
| | |
|---|---|
| adda (a, b, c) | Add the contents of array[b] and the contents of array[c] and store the result into array[a] |
| suba (a, b, c) | Subtract the contents of array[c] from the contents of array[b] and store the result into array[a] |
| cmpa (a, b, c) | Compare array[b] and array[c] contents and store the result into array[a]<br>(0×00: equal, 0×01: yy>zz, 0×02: yy<zz) |
| addv (a, b, c) | Add the contents of array[b] and the value of c and store the result into array[a] |
| subv (a, b, c) | Subtract the value of c from the contents of array[b] and store the result into array[a] |
| cmpv (a, b, c) | Compare the contents of array[b] and the value of c and store the result into array[a]<br>(0×00: equal, 0×01: yy>zz, 0×02: yy<zz) |

[jump, branch]
| | |
|---|---|
| jmp (a) | Jump to line a |
| eq (a, b, c) | Jump to line c if the contents of array[a]= the value of b |
| ne (a, b, c) | Jump to line c if the contents of array[a]≠ the value of b |

[point calculation]
| | |
|---|---|
| pointa (a) | Add the contents of array[a] to point data |
| pointv (a) | Add value a to point data |

[return response to terminal]
| | |
|---|---|
| return | Return rsp[] as response data, and wait for next command |
| end | Return rsp[] as response data, and exit from game script execution |

FIG. 14

| LINE | SCRIPTS | COMMENT |
|---|---|---|
| 00 | random (0, 2) | Store a random number (0 to 2) into array[0] |
| 01 | setrspa (0, 0) | Store the contents of array[0] into rsp[0] |
| 02 | return | Return response, and wait for command |
| 03 | random (1, 2) | Store a random number (0 to 2) into array[1] |
| 04 | setrspa (1, 0) | Store the contents of array[1] to rsp[0] |
| 05 | return | Return response, and wait for command |
| 06 | random (2, 2) | Store a random number (0 to 2) into array[2] |
| 07 | setrspa (2, 0) | Store the contents of array[2] into rsp[0] |
| 08 | setrspv (1, 1) | Store a value of 1 (to indicate the lost) into rsp[1] |
| 09 | cmpa (3, 0, 1) | Compare array[0] and array[1] contents and store the result into array[3] |
| 0a | cmpa (4, 0, 2) | Compare array[0] and array[2] contents and store the result into array[4] |
| 0b | eq (3, 0, 0d) | Jump to line 0×0d if array[3] contains 0 |
| 0c | end | Return response, and exit |
| 0d | eq (4, 0, 0f) | Jump to line 0×0f if array[4] contains 0 |
| 0e | end | Return response, and exit |
| 0f | pointa (50) | Add 50 to point data |
| 10 | setrspv (2, 50) | Store 50 (points won at this game) into rsp[2] |
| 11 | end | Return response, and exit |

FIG. 16

| LINE | SCRIPT | COMMENT |
|---|---|---|
| 00 | getcmd (0, 0) | Store the value of cmd[0] into array[0] |
| 01 | random (1, 2) | Store a random number (0 to 2) into array[1] |
| 02 | cmpa (2, 0, 1) | Compare array[0] and array[1] contents and store the result into array[2] |
| 03 | setrspa (1, 0) | Store the contents of array[1] into rsp[0] |
| 04 | setrspa (2, 1) | Store the contents of array[2] into rsp[1] |
| 05 | return | Return response, and wait for command |
| 06 | getcmd (0, 0) | Store the value of cmd[0] into array[0] |
| 07 | random (1, 2) | Store a random number (0 to 2) into array[1] |
| 08 | cmpa (3, 0, 1) | Compare array[0] and array[1] contents and store the result into array[3] |
| 09 | setrspa (1, 0) | Store the contents of array[1] into rsp[0] |
| 0a | setrspa (2, 1) | Store the contents of array[2] into rsp[1] |
| 0b | return | Return response, and wait for command |
| 0c | getcmd (0, 0) | Store the value of cmd[0] into array[0] |
| 0d | random (1, 2) | Store a random number (0 to 2) into array[1] |
| 0e | cmpa (4, 0, 1) | Compare array[0] and array[1] contents and store the result into array[4] |
| 0f | setrspa (1, 0) | Store the contents of array[1] into rsp[0] |
| 10 | setrspa (2, 1) | Store the contents of array[2] into rsp[1] |
| 11 | setrspv (1, 2) | Store a value of 1 (to indicate the last) into rsp[1] |
| 12 | ne (2, 0 14) | Jump to line 0×14 if the contents of array[2]≠0 |
| 13 | set (5, 20) | Store 20 (points won per game) into array[5] |
| 14 | ne (3, 0, 16) | Jump to line 0×16 if the contents of array[3]≠0 |
| 15 | addv (5, 5, 20) | Add 20 (points won per game) to array[5] |
| 16 | ne (4, 0, 16) | Jump to line 0×18 if the contents of array[4]≠0 |
| 17 | addv (5, 5, 20) | Add 20 (points won per game) to array[5] |
| 18 | pointv (5) | Add the contents of array[5] to points |
| 19 | setrspa (5, 2) | Store the contents of array[5] (final points) into rsp[2] |
| 1a | end | Return response, and exit |

FIG. 17
SHOOTING GAME: TARGET NUMBER=5, ROUND NUMBER=5
(a)
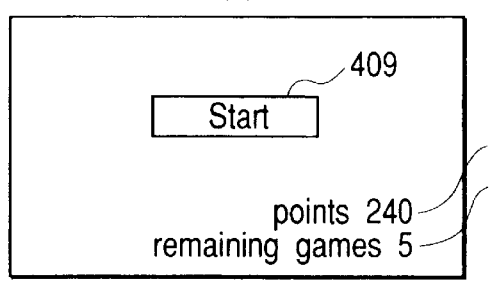
(b)
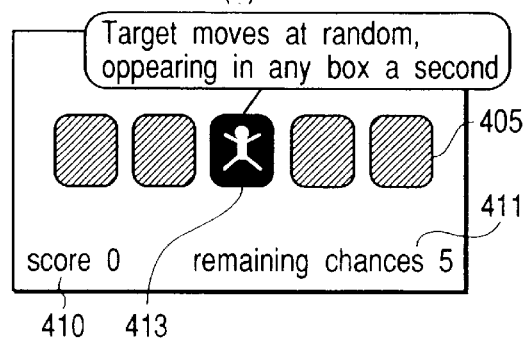
(c)
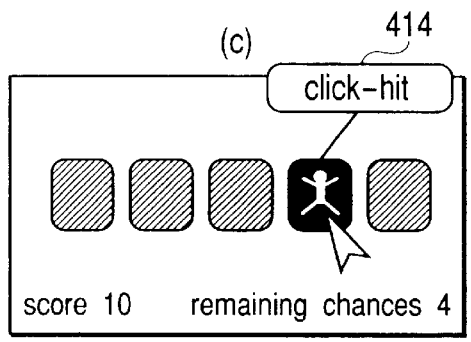
(d)
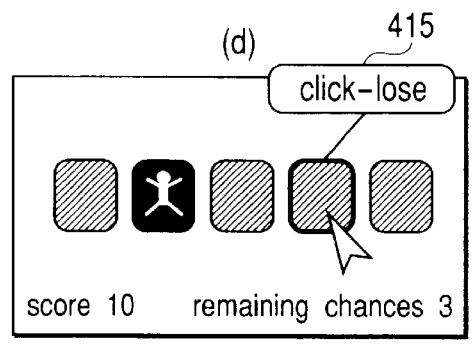
(e)
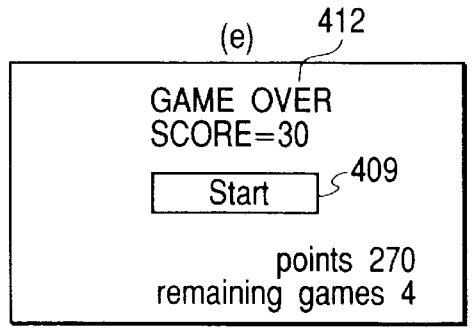

FIG. 19

| LINE | SCRIPT | COMMENT |
|---|---|---|
| 00 | set (0, 0) | Store 0 into array[0] (loop index) |
| 01 | set (1, 0) | Store 0 into array[1] (points won) |
| 02 | set (2, 0,) | Store 0 into array[2] (random number to be compared with input) |
| 03 | getcmd (3, 0) | Store the value of cmd[0] into array[3] |
| 04 | eq (3, 0, 12) | Jump to line 0×12 if array[3] contents 0 (Comparing values follows) |
| 05 | cmpa (4, 2, 3) | Compare array[2] and array[3] contents and store the result into array[4] |
| 06 | setrspa (4, 0) | Store the contents of array[4] (result of comparison) into rsp[0] |
| 07 | addv (0, 0, 1) | Increment the counter value contained in array[0] by one |
| 08 | setrspa (0, 1) | Store the contents of array[0] (loop count) into rsp[1] |
| 09 | ne (4, 0, 0b) | Jump to line 0×0b if the contents of array[4]≠0 (means loosing) |
| 0a | addv (1, 1, 10) | Add 10 (additional points) to array[1] |
| 0b | eq (0, 5, 0e) | Jump to line 0×0e if the contents of array[0]=5 (last) |
| 0c | return | Return response and wait for command |
| 0d | jump (03) | Jump to line 0×03 (beginning of loop) (Last loop execution follows) |
| 0e | pointv (1) | Add the contents of array[1] to points |
| 0f | setrspa (1, 2) | Store the contents of array[1] (points) into rsp[2] |
| 10 | setrspv (1, 3) | Store a value of 1 (to indicate the last) into rsp[3] |
| 11 | end | Return response and exit (Generating a random number follows) |
| 12 | random (2, 5) | Store a random number (0 to 4) into array[2] |
| 13 | addv (2, 2, 1) | Increment the value contained in array[2] by one (the range of random numbers change to 1 to 5) |
| 14 | setrspa (2, 0) | Store the contents of array[1] (random number) into rsp[0] |
| 15 | return | Return response and wait for command |
| 16 | jump (0, 3) | Jump to line 0×03 (beginning of loop) |

METHOD OF LOADING AN APPLICATION PROGRAM INTO A SMART CARD, SMART CARD, METHOD OF LOADING SCRIPTS INTO A SMART CARD, TERMINAL DEVICE CAPABLE OF OPERATING WITH A SMART CARD, AND STORAGE MEDIUM HOLDING AN APPLICATION PROGRAM

BACKGROUND OF THE INVENTION

The present invention relates to a method of loading an application program into a smart card, to smart cards, to a method of loading scripts into a smart card, a terminal device capable of operating with smart cards, and to a storage medium holding an application program; and, more particularly, the invention relates to a computer system with highly-reliable security, especially, to a system having its kernel built on an IC card, wherein an application program stored into its nonvolatile storage can run inside the card.

IC cards (termed smart cards) furnished with a built-in CPU (Central Processing Unit) that enables operations to be carried out inside the card are expected to be used in various application fields, particularly, in financial applications, such as the those involving electronic money, and their introduction into use has been advancing positively in late years because of their information storage capability and their highly-reliable security characteristics.

Recently, operating systems (OSs) for such cards, enabling the safe coexistence of multiple applications on a single card, have been generally used. Examples of these OSs for such cards, that support multiple applications on the card, include "MULTOS" supplied by Mondex International and "Java Card" (TM) supplied by Sun Microsystems, Inc. Smart cards with this kind of multi-application OS are controlled so that the application programs installed on the card will be highly independent of each other when running. Not only can a plurality of programs safely coexist on these cards, but also a new application can be added to these cards after a card is issued, or an unnecessary application program can be removed from them. Thus, these cards can be regarded as safe computers, rather than as simple information storage devices. From the viewpoint of active use of their highly-reliable security feature, or as new cards that supercede the conventional magnetic card function, smart cards are expected to have applications in the financial field, such as credit cards or electronic money, especially, as an implementation of the interlinking of a plurality of applications.

Conventionally, a point system or a customer-loyalty system (hereinafter referred to as a point system) has been generally used as a means of getting more customers. This system is defined as "a system in which a customer's points increase by the use of the customer Is card and the customer can be granted a predetermined service according to the accumulated points." On the basis that customers expect to be granted some privilege by getting points, shop managers and card issuers aim at the effect of promotion in the use of cards for shopping at their shops. Examples of such a system are stamp cards that are valid only in a shopping district, department stores' point systems, or airlines' mileage programs. As one example, a department store's point system will be explained below.

Customer members have their cards issued from the department store. Whenever a member as a customer makes a purchase at the store and presents his or her card to the clerk, the customer gets points according to how much he or she paid (for example, 20 points are added per each ten dollars of payment) and the points are accumulated and recorded in the customer's purchase log. When a predetermined amount of points have been accumulated, the customer can exchange the points for a gift certificate. For example, the customer can exchange 1,000 points for a gift certificate of ten dollars. In other words, customers who are members of the program gain by a discount rate that is ten dollars per purchase amount of five hundred dollars, according to the calculation in this case. Department stores may offer an additional discount in such a manner that the points are added at a double rate during a special holiday period or if the amount a customer has paid for a purchase or service at the department store per year reaches a certain amount, his or her discount rate rises. In this way, department stores usually stimulate the desire for a customer to buy more.

For airlines' mileage programs, as another example, the flight distance of travel per customer instead of the amount the customer has paid is accumulated. In a system of this kind, if the total distance that a customer has traveled by using an airline reaches a predetermined flight distance, the airline grants the customer some privilege such as a free airline ticket or a seat upgrading. In this case, similarly, the airline offers a service accordance with the log of a customer who has used the airline, thereby motivating customers to select the same airline again. By installing such a point system on a smart card, points of the card user can be correctly managed by means of the card. For a smart card with a multi-application OS, linking with electronic money or the credit card facilities can make use of the point system more effectively.

As one application that utilizes the feature of the above-described smart card supporting the compatibility of multiple applications, a "point system with a game on smart cards" has been proposed. In this system, a game program is integrated with a point system on the card and the point value may increase according to the result of the game stored in the card. Patents regarding this system were applied for in Japanese Patent Application No. Hei 10-239812 and Japanese Patent Application No. Hei 10-321684. In this system, the count of user-playable games is defined as "rights to play a game", and a method in which the smart card program can implement a game application safely by managing the rights to play a game and the points given as a result of playing the games has been proposed.

Moreover, another system in which a plurality of specific programs can be incorporated into a point management program has been propose as a method of managing a point system on smart cards. A patent regarding this system was applied for in Japanese Patent Application No. Hei 10-307216. According to this method, by embedding shop-specific programs into the point management program, points from a plurality of shops can be managed on a shop-by-shop basis by running a single program of point application.

SUMMARY OF THE INVENTION

The multi-application smart card OSs such as "MULTOS; have a predetermined loading mechanism in view of security. The loading mechanism is used to check that the downloaded application is not falsified, that an authorized programmer has programmed the application, and that the card is granted the necessary permission to download the application program. For example, checking to see whether the application program is falsified is performed as follows. As signature data, a hash value of the application program, encrypted in the secret-key crypt system of the Certificate Authority (CA) is attached to the application program. This hash value as the signature is compared with a hash value recalculated on the card for a match and thereby verification can be performed. Checking the above matters is important, since the safety of the smart card is dependent on these procedures. Thus, a strict procedure for each card type is prescribed and the mechanism is designed so that the application program transferred to the card cannot be downloaded unless it is coded in a predetermined data format. This regulation is called an "application issue scheme."

Accordingly, in order to load an application program into a smart card in which the multi-application OS is installed, a predetermined application authentication and registration procedure must be carried out, according to the above application issue scheme. Consequently, the actual operation of replacing an application program installed op the card by another program requires considerable time and labor, though this is, in principle, possible after the card is issued. This is inevitable for maintaining the safety of the smart card. Notwithstanding, this problem is not considered significant for ordinary financial applications for which the program contents do not change very frequently.

For game applications, however, frequent updating of their contents is required, because users may tend to lose interest in playing a game unless varieties of games are available. Considering that the application authentication and registration procedure must be carried out each time a new game is loaded, while frequent game exchange is desirable, such complex procedure would deter us from taking full advantage of game application features.

Another problem arises with separately developing and distributing different application programs for different types of games. When points acquired by playing an old type of game are transferred into a new type of game, some procedure is required and point management in view of this transfer becomes complex.

In the application development phase, separately programming applications with similar facilities by each request is a very time-consuming process. During the developing and distributing of many types of game applications, management of issues and management of distribution when applications are loaded into the cards are required.

Furthermore, in the current situation, where different OS types for smart cards such as "MULTOS" and "Java Card" coexist, an OS incompatibility problem further increases the reprogramming time. Game applications that run on smart cards under different OS types must be rebuilt separately on a plurality of platforms that use different OS types whenever game exchange occurs.

These problems are not limited to game applications, but similar problems are expected to occur with applications designed to run on smart cards for which frequent update of the contents for processing is desirable.

An object of the present invention is to provide a game application program designed to run on a smart card, which makes it possible to increase game variations to be run in the program without being burdened by a complex procedure of application program replacement, whereby the card user can readily play one of a plurality of types of games on the card and new games can be developed independent of the difference between the OSs under which they are to be run.

If the present invention is extended to general applications beside game applications, another object of the present invention is to provide an application program designed to run on a smart card, which makes it possible to increase the process variations to be run in the program without being burdened by a complex procedure of application program replacement, whereby the card user can readily request one of a plurality of types of processes on the card and new processes can be developed independent of the difference between the OSs under which they are to be run.

In order to attain the above objects, means to run one of a plurality of types of games in a single application program installed on a smart card are proposed.

A conceivable way that is considered a primary feature is sharing the entities (data storage and processor) for the point data obtained as a result of playing games and the rights to play a game with a plurality of games once the entities of managing the point data and the rights to play a game have been set to commonly run in the game program processing, virtually, it can be considered that only the algorithm for judging a game result differs depending on the game that is requested to be run.

Through close examination of the types of games to be primarily run on smart cards that are not regarded as having a complicated calculation capability, it is obvious that processes required to execute games are "receiving data sent from the user via the terminal," "generating a random number," "simple addition/subtraction," "storing data," and "data comparison and branching" in combinations that are iterated. If part of an application program is made modular, that is, if it is made up of "components" that independently implement the above processes, games can be defined in "scripts" like a representation that defines a sequence in which these components are called. Specifically, preparing processing modules, namely "components" to implement the processes required to execute games and an "interpreter" for interpreting and executing scripts in a single application program is essential. This makes it possible to run one of a plurality of different games by selectively executing the game definition "scripts" generated outside the program.

If such scripts are permitted to be loaded from outside or unloaded if necessary as part of an application program through a terminal, it becomes possible for a single game application program on a smart card to offer a plurality of games of different types that can be selectively executed.

Exchanging or adding scripts, if assumed feasible, however, means that any script can be stored into an application program, and there is a possibility of including a game in ill-intentioned scripts, which may result in the possibility that some user could get points by foul play with such a game. The security of smart cards is satisfactory, but becomes useless for such foul play. As a substitution for the application program issue scheme defined as the card OS security mechanism, a pseudo issue scheme must be provided within an application program installed on the card to control the storing of scripts and to prevent ill-intentioned scripts from being stored. Specifically, a controller must be provided to control loading and unloading of scripts so that ill-intentioned scripts will be shut out from the application.

The present invention assures safety in the loading of scripts by providing the application program installed on the smart card with a pseudo issue scheme instead of the application program issue scheme that the OS of the card has. The invention also prepares the processing entity for interpreting and executing scripts within the application program, so that a single application program can offer types of games which have different features, though are limited.

Points may increase, according to the result of playing a game, and the player can later be granted a predetermined service (for example, exchanging points for a commodity), according to the points. Data of these points, of course, can be processed commonly for a plurality of games and, in addition, can be managed for each game issuer by adding game issuer information to the game definition scripts stored into the card.

Therefore, as a means to solve the above-mentioned problems, the present invention comprises the following six major components.

As the means to be provided on the smart card side.

(1) An application program consisting of the following elements:
   (a) Came executing components: A set of modules for implementing the processes programmed in the card, required to execute the game application;
   (b) Storage for game definition scripts: Area for storing scripts that define a sequence in which the components are to be executed;
   (c) Script interpreter: Interpreter for interpreting and executing game definition scripts;
   (d) Storage and processor for point data: Area for storing points that may increase according to the result of playing a game, and the processor for point data management;
   (e) Storage and processor for rights to play game: Area for storing the count of rights to play a game and the processor for managing the rights to play a game; and
   (f) Command analyzer: Processor to analyze commands from a terminal and call the appropriate process within the program.

The above are necessary. In addition, (2) Processor for storing game definition scripts: The processor has the function of managing the storing of game definition scripts and of exchanging scripts. Processing by this processor is based on the game issue scheme prescribed in the application program.

(3) Function of point management per issuer: Manages points and rights to play a game per issuer.

The above two functional entities are prepared as required.

The following are required for a terminal device for operating with the smart card in question:

(4) Function of issuing a game: Issues game definition scripts and/or rights to play game to the smart card by performing data communication with the smart card under a predetermined protocol. Game definition scripts and rights to play game may be separately managed or put under integrated management.

(5) Function of executing a game: Executes a game by sending user-input commands for playing a game to the card and by receiving responses from the card by performing data communication with the smart card under a predetermined protocol. A user interface that allows the user to play games is also required.

(6) Function of calculating points: Obtains the point count stored in the card and sets a new point count (by subtraction, primarily) by performing data communication with the smart card under a predetermined protocol. Point calculation is executed with an issuer identifier if point data-management per issuer is performed.

A single terminal may be provided with all of the above functions in items (4) to (6) or separate terminals may take part of the functions.

Other and further objects, features and advantages of the invention will appear more fully from the following description.

BRIEF DESCRIPTION OF THE DRAWINGS

A preferred form of the present invention is illustrated in the accompanying drawings, in which:

FIG. 12 is a chart showing an example of scripts described in a language to call common process components;

FIG. 14 is a chart showing an example of scripts described for the slot machine game;

FIG. 16 is a chart showing an example of scripts described for the roulette game;

FIG. 17 is a diagram which illustrates an example of a shooting game;

FIG. 19 is a chart showing an example of scripts described for the shooting game.

DETAILED DESCRIPTION OF THE PREFERRED EMBODIMENTS

Figure 1:
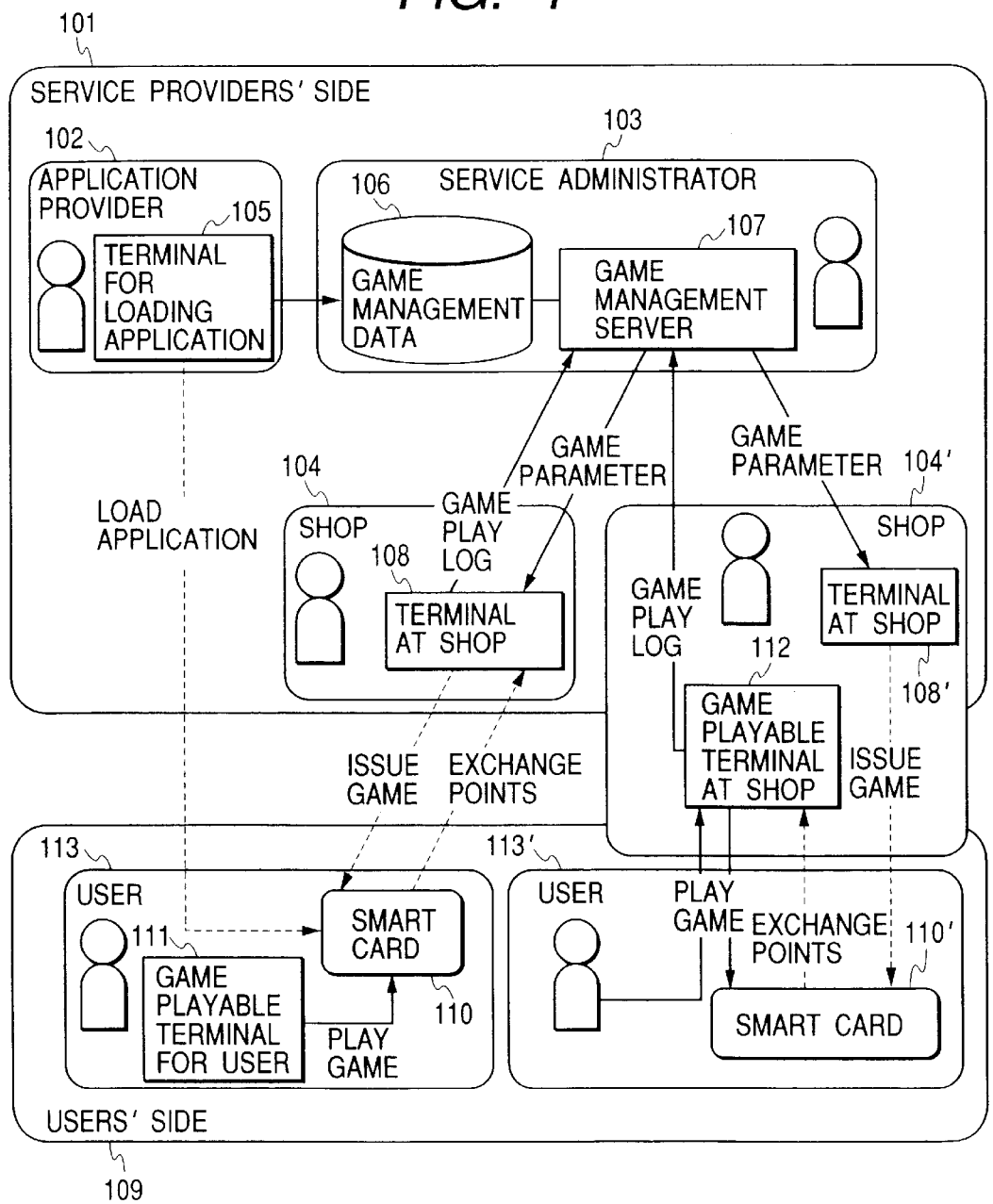
FIG. 1 is a conceptual block diagram illustrating how a game and point system using smart cards serves customers.

FIG. 1 shows a conceptual block diagram illustrating how a game and point system using smart cards serves customers. The system is roughly divided into the service providers' side (101) and the users' side (109). The service providers' side (101) comprises an application provider (102) that distributes a game application by loading it into smart cards and terminals, a service administrator (103) that administrates game operation, and shops (104) at which a game issue is loaded into a smart card of a user and points are exchanged for a service. Here, the application provider (102) and service administrator (103) may be provided as a single entity, or the application provider (102) and service administrator (103) may be separate entities. In a normal situation, a plurality of shops (104) exist at separate sites. In some cases, a shop (104) exists only at one site and belongs to the same application provider (102) and service administrator (103). The users' side (109) consists of one or more users (113) and each user (113) possesses at least one smart card (110). The user (113) may possess a game playable terminal (111) provided with an input/output function for executing a game application installed on the card (but, this terminal is not necessary). The game playable terminal (111) need not be limited to that only having facilities dedicated to playing games, but also may be an ordinary personal computer (PC) with a smart card reader/writer (a smart card accessing device) or a special portable terminal for operating with smart cards, having facilities such as checking the user's balance recorded in the card, provided that it has at least the function of data input/output to/from a smart card (110) and a support (as an auxiliary) of game application execution.

The application provider (102) first loads a game application into the smart card (110) of each user (113). In the typical case, a game application is loaded into the card when the smart card (110) is issued to the user (113) After the issue of the card, a game application can be freely loaded into the card, which is a feature of the smart card on which the OS supporting the compatibility of multiple applications on the card is installed. The information on loading applications may be reflected in game management data (106) which will be described later.

The service administrator (103) retrieves necessary data from the game management data (106) database in which all kinds of information on the game and point system in question are filed and uses a game management server (107) to distribute game parameters to terminals (108) at the shops.

Shops (104) issue rights to play a game or game patterns to smart cards (110), according to how much the user (113) has paid (shopped) at the shop. The rights to play a game mean the rights for the user to play a game and the rights are decreased by one after the user plays one game. The game patterns mean types of parameters of games to be executed within the smart card, including rights to play a game.

Having rights to play a game given to the smart card (110), users (113) can play games installed in the card by means of the game playable terminal (111) or a game playable terminal (112) placed in a shop (104) (As with the game playable terminal for the user, the terminal managed by a shop may be in any form, provided it has an interface for a smart card and a game execution support function). According to the result of game play, the points in the smart card (110) are updated.

The points can be exchanged for a commodity or a prize at the shop (104). Game issue data, user game play log data, and point exchange log data, whenever generated, are saved and stored into the database of game management data (106) and fed back to the next process for generating game parameters and issuing a game. In this way, the service administrator dynamically controls game parameters by using the latest game data, so that the service provider (101) can manage overall system circumstances.

Figure 2:
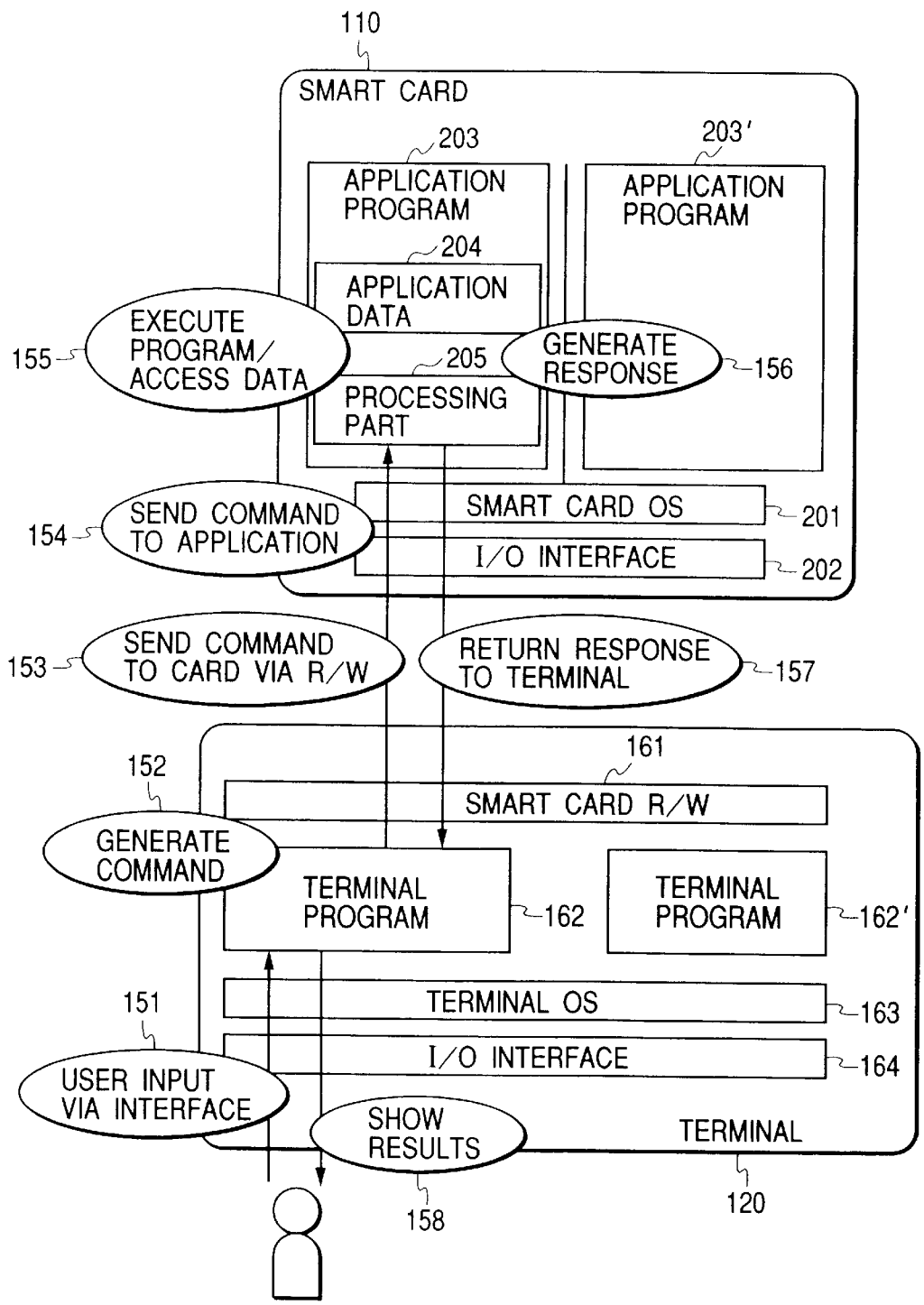
FIG. 2 is a diagram illustrating the information flow during program execution on a smart card that supports the compatibility of multiple applications on the card.

Now, information flow during program execution on a smart card that supports the compatibility of multiple applications on the card will be briefly explained with reference to FIG. 2. The smart card (201) is equipped with an I/O interface (202), and one or more applications (203) are assumed to have been loaded into it, according to a predetermined procedure. The application program (203) and the application program (203'), as shown, are separate independent programs and each program is inhibited from making an illegal access to the other program. A terminal (120) is equipped with a smart card reader/writer (161) and an I/O interface (164), and a terminal OS (163) is installed on it; and moreover, one or more terminal programs (162) for processing with a mating application program installed on the smart card are installed on it. One or more terminal programs for processing with one application program on the smart card are normally required.

When the user (or a clerk) performs an input (151) to the terminal (120) via a user interface, the terminal program (162) generates a command (152) to be sent to the smart card. The terminal program (162) sends the command to the smart card (110) (153) via the smart card reader/writer (161). When the smart card (110) receives the command, the smart card OS (201) determines an application program (203) to which the command is to be sent and sends the command (154) to the application program (203) as the terminal program (162) intends. The processing part (205) of the application program (203) executes processing in accordance with the command; it accesses the application data (204) database, performs value update (155), and generates a response (156). The response is returned (158) to the terminal (120), and the terminal program (162) shows results (168). This is a series program execution flow.

Even if a plurality of application programs (203) have been loaded, the intended program execution on the smart card (110) can be performed via the terminal (120) by terminal program (162) switching to the appropriate application program (203) to which the command is issued. Basically, the application programs (203) on the smart card (110) are controlled so as not to affect the data for another program illegally. However, for example, under "MULTOS", a plurality of application programs can operate in linkage with each other by a predetermined method termed delegation (meaning that one program entrusts or transfers a process to another program). (The latest version of "MULTOS" is provided with this function. The delegation function is not described in detail herein.)

Next, concrete smart card configurations for the game and point system embodied in a preferred embodiment of the present invention will be explained with reference to FIGS. 3 to 8. The following explanation will be made by using as an example the case where two types of games are available on the card. Here, the "types" of games are game variations for which different algorithms are used to define how game results are reflected in points, where algorithms shall be basically defined by the combination of the processes within the card, such as data calculation and random number generation.

Figure 3:
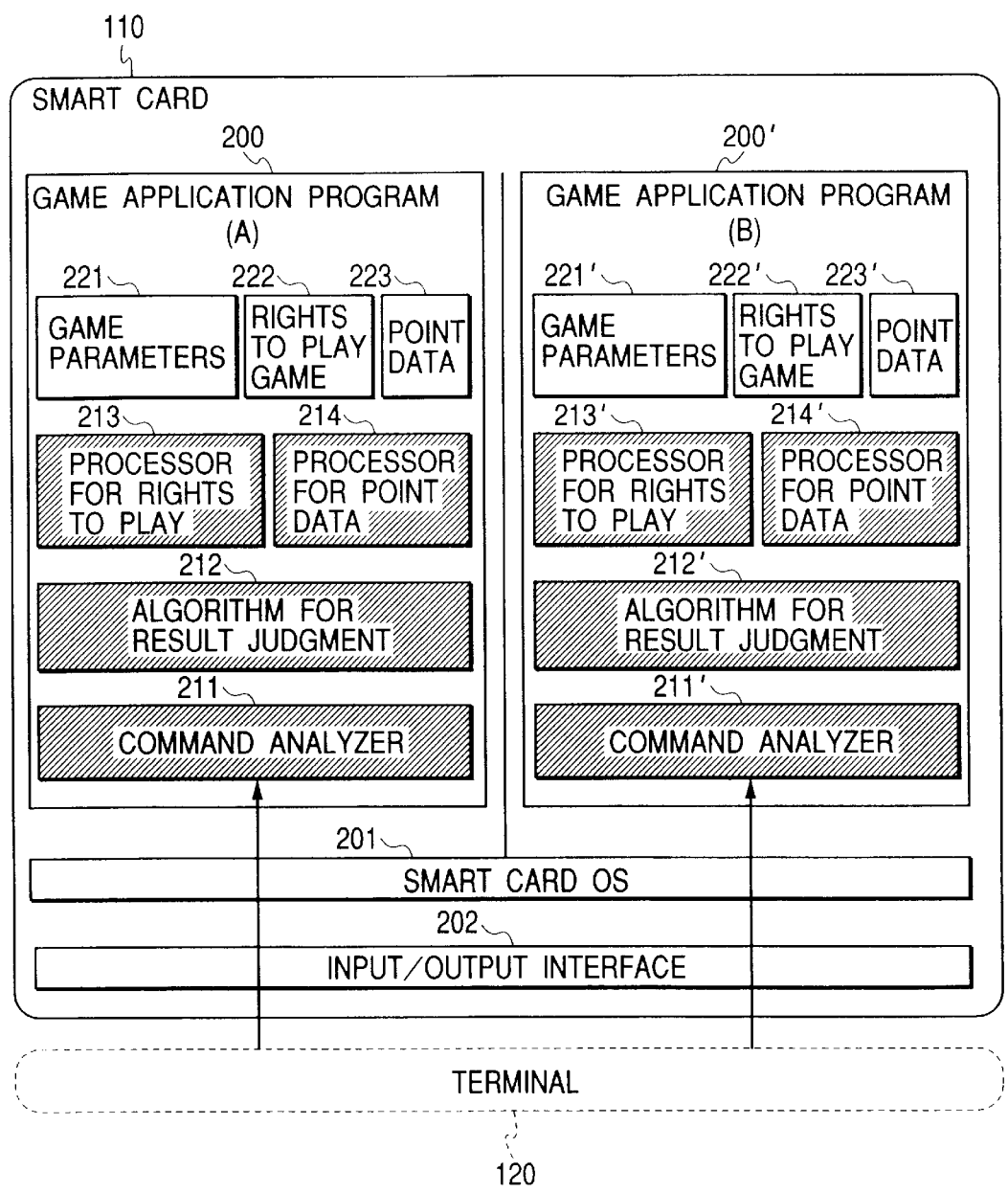
FIG. 3 is a diagram illustrating a specific smart card configuration for the game and point system concerned with a preferred embodiment of the present invention (first embodiment)

FIG. 3 shows a smart card configuration that can be embodied to run game applications according to the previous invention for which the application for patent was filed (as Japanese Patent Application No. Hei 10-239812 and Japanese Patent Application No. Hei 10-321684), wherein two types of games are available on the card. The smart card (110) operates under the card OS (201) supporting the compatibility of multiple applications on the card, such as "MULTOS" and "Java Card" and is equipped with the input/output interface (202) for data transfer to/from the terminal (120). The specifications of the above previous invention state that a respective algorithm for result judgment is defined for each application. Thus, as many game application programs (200) as the number of game types available on the card are necessary. In this configuration, as shown, a first game application is marked (A) and a second game application is marked (B).

The game application program (A) (200) comprises the data storage portions for game parameters (221), rights to play a game (222), and point data (222), and the actual processing parts include a command analyzer (211), algorithm for result judgment (212), processor for rights to play (213), and processor for point data (214). The shaded portions in the figure, (211), (212), (213), and (214) are the processing parts that become fixed once the program has been loaded into the card. Data contained in the storage portions (221), (222), and (223) changes with the program execution. Commands from the terminal (120) are roughly divided into those regarding game issue from a shop and those regarding game play from the user. The command analyzer (211) distributes commands to the processors, according to the command type, and the processors execute processing and thereby the points may increase and the rights to play a game decrease. When receiving commands for playing a game from the user, the game is executed, according to the algorithm of result judgment (212) and game parameters (221) depending on the user input. According to the game result, the points in the point data (223) storage may increase and the count of the rights to play game (222) are decremented by one per game. The count of the rights to play is controlled so that the user cannot play with game in excess of the user-playable game count corresponding to the rights given to the user from a shop.

The game application program (B) (200') is also configured the same as the program (A) and includes independent processing program components installed. Because commands from the terminal (120) are sent after application selection, independently set commands are issued to each of the game application programs (200) and (200'), thereby running the application program. Of course point data (223) and (223') are also stored separately, and in principle, integrated processing for point exchange is impossible. Definitely different parts between game (A) and game (B) are the algorithms for result judgment (212) and (212'). Other components for processing of rights to play a game and points consist of similar functional units. Notwithstanding, separate programs execute separate processing and this should be considered a problem in view of quite an ineffective use of the limited resources of the smart cards.

To run the game application (A) program (200) and the game application (B) program (200') which are essentially separate applications under "MULTOS," it is necessary to carry out the application registration and authentication procedure for each program in accordance with the application issue scheme defined for the OS when installing the applications. An outstanding feature of smart cards supporting the compatibility of multiple applications on the card is that dynamic application loading and unloading are possible after the card has been issued. For applications such as game software for which frequent updating of the contents is desirable, however, whenever a new game program programmed to run with another algorithm is loaded, carrying put the application registration and authentication procedure is troublesome and burdensome. Moreover, when a switching from game (A) to game (B) occurs, the user might wish the accumulated points, as a result of the previous plays with the game (A), to be inherited for self esteem. For the smart card configuration shown in FIG. 3, however, it is not simple to transfer points from one game to another and perform accompanied point information management.

As concerns counting points in common for a plurality of games, a possible method of resolving the problem is using a special application for point management besides game applications. This method is feasible by the above-described previous invention. This method is such that a point application program, in addition to game applications, is prepared and point data management is performed within it. When requested from the game applications, point change processing is executed by using the delegation of the card OS (201). Even if the integrated point management problem is solved by using this method, however, the application registration and authentication procedure for a new game program to be added is still required and the above method does not provide a drastic solution.

Now, a method of processing a plurality of types of games within a single application will be considered below.

Figure 4:
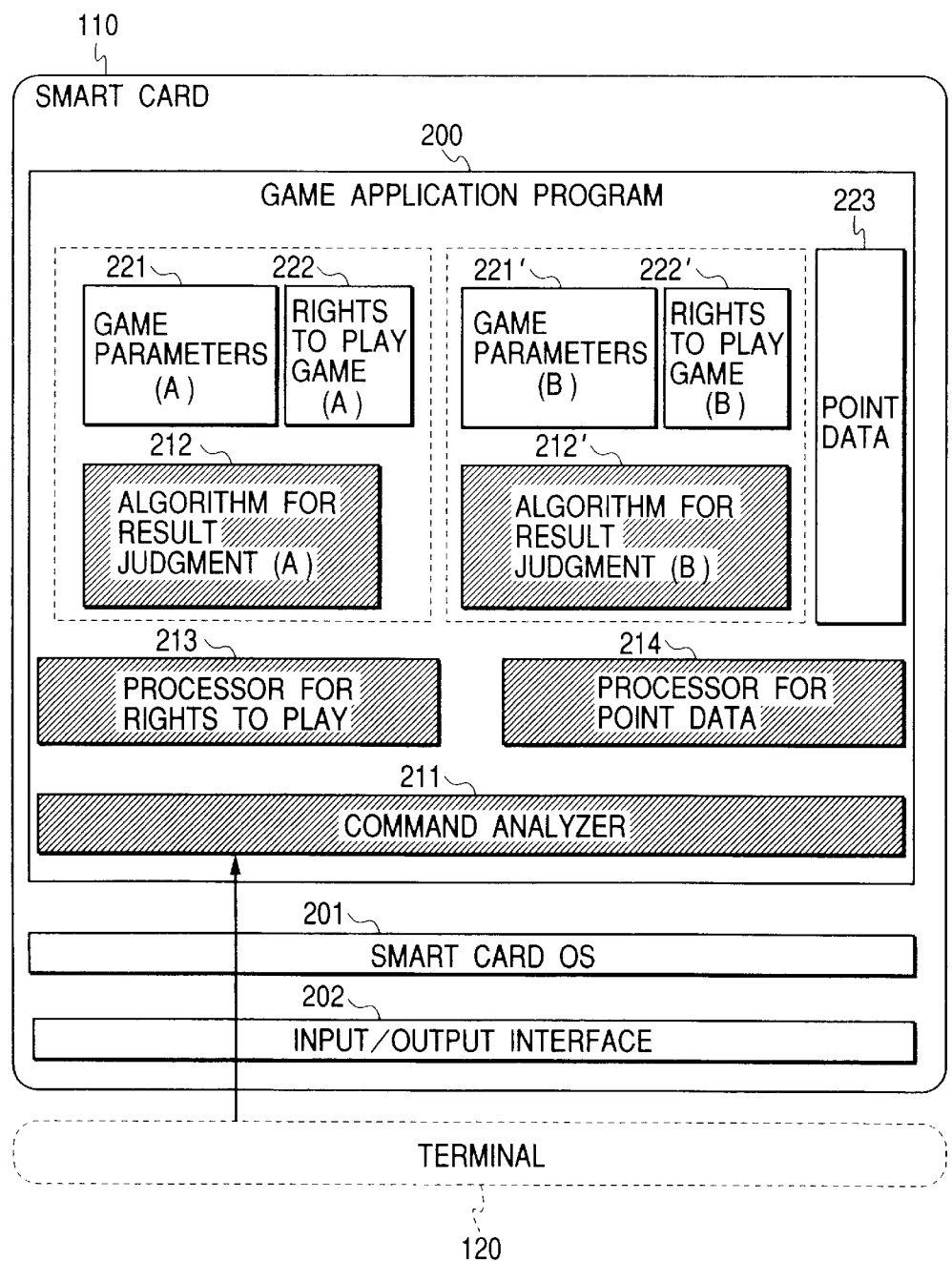
FIG. 4 is a diagram illustrating a specific smart card configuration for the game and point system concerned with a preferred embodiment of the present invention (second embodiment)

FIG. 4 shows a smart card configuration according to a method in which a game application is installed comprising common parts for point data, for which integrated management is desirable, and command processing and portions for specific processing, such as game parameters and a result judgement algorithm. As many of the latter portions are provided as the number of game types. On the smart card (110) a game application program (200) is installed, wherein two types of games, game (A) and game (B) can be processed. Although another game type, game (C), of course, can be incorporated into the program, the following explanation will discuss, as an example, the case where the application program accommodating two games is installed, as shown. Note that the game types to be executed are fixed when the application is issued and adding a new game cannot be performed in this example.

Point data (223) storage is common so that points acquired as the result of game play can be processed in common for a plurality of types of games. The command analyzer (211) that receives commands from the terminal and supplies them to the appropriate processor is also common to a plurality of games, separate from the game processing components. Game parameters (221), rights to play a game (222), and an algorithm for result judgment (212) are provided, in as many a number as the number of game types, as the components to execute different processing for different games. The processor for rights to play (213) and processor for point data (214) are provided as a common processor.

A command identification scheme is established in advance so that commands sent from the terminal (120) can be identified, according to the game type. The command analyzer (211) analyzes commands it receives, finds which game type to which the commands, and selects the appropriate algorithm for the commands. If the commands are those for game (a), processing is executed, according to the algorithm for result judgment (212) for game (A), and the point data (223) may be updated, according to the result of the processing. Updating the points in the point data (223) storage is performed in the same way whether game A or game (B) has been executed.

Figure 5:
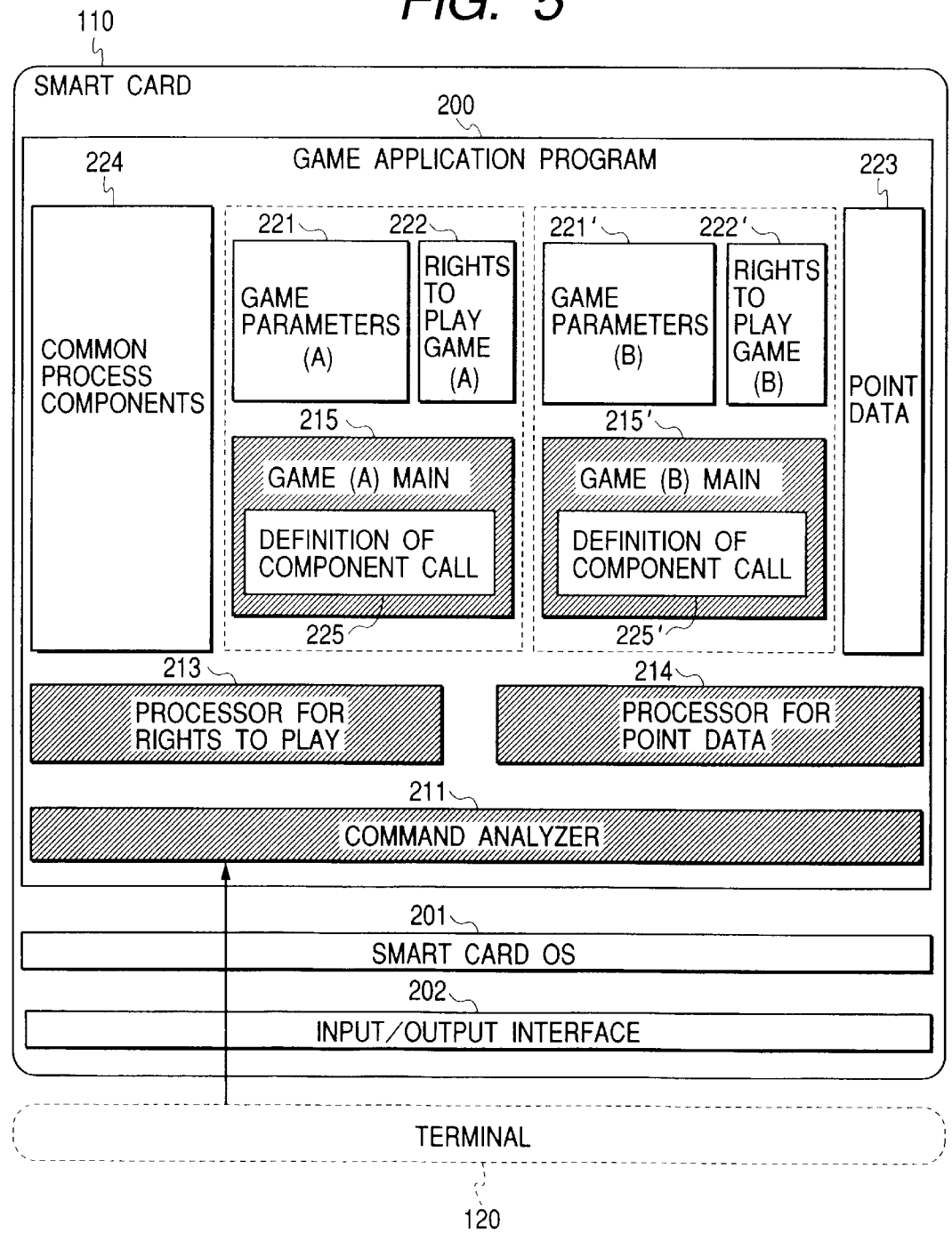
FIG. 5 is a diagram illustrating a specific smart card configuration for the game and point system concerned with a preferred embodiment of the present invention (third embodiment)

FIG. 5 shows a smart card configured according to a game execution method upgraded from the corresponding method for the card shown in FIG. 4. Basically, most of the game processes can be represented as the iteration of processing of user input values, generating a random number in the card in accordance with the input timing, and judging the result from the combinations of local variables and constants given as parameters. Even if the algorithm for result judgment differs between games, most of the other portions of a game application can be executed in common. Thus, part of the game application is made modular for that can be processes executed in common for a plurality of games, such as generating a random number, addition/subtraction, and iteration as common process components. Common process components (244) are prepared as component modules for executing processes that are required in a similar context.

With the focus on game (A), the application includes the storage areas for game parameters. (221) and rights to play a game (222), and a definition of a component call (225) in the game (A) main (215) defines the procedure for judging whether the user wins at the game, that is, what sequence in which the common process components (224) are to be called. The program is executed in almost the same way as for the method used for the smart card shown in FIG. 4. The command analyzer (211) selects the appropriate game main, according to the command type. Thereby, a plurality of games, as assembled into the program beforehand, can be processed. For the smart card shown in FIG. 5, as compared with that shown in FIG. 4, the processes that can be executed in common are packaged as components in as large a part of the program as possible, so that an efficient application operation can be achieved.

Whether in the game execution method for the card shown in FIG. 4 or in the corresponding method for the card shown in FIG. 5, a plurality of game types assembled in advance into the application as the application was programmed can be processed and one of the different games can be executed, the appropriate one being selected in accordance with the commands from the terminal, but another game type cannot be assembled into the application once the programmed application has been issued. To enable another game type to be executed on the card, it is necessary to program a new application that accommodates the game and replace the existing application on the card by the new application, when the application registration and authentication procedure must be carried out again.

Figure 6:
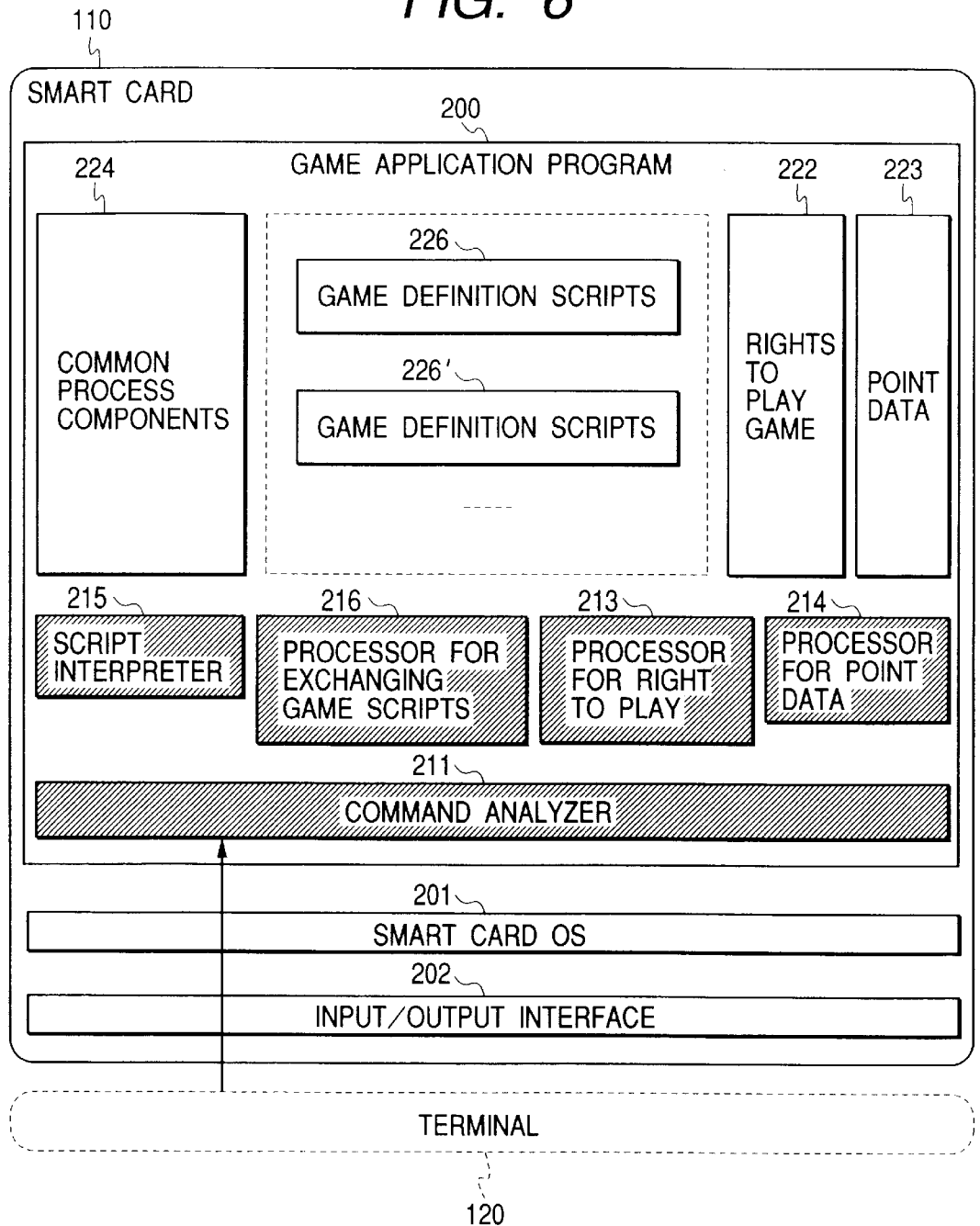
FIG. 6 is a diagram illustrating a specific smart card configuration for the game and point system concerned with a preferred embodiment of the present invention (fourth embodiment)
Figure 7:
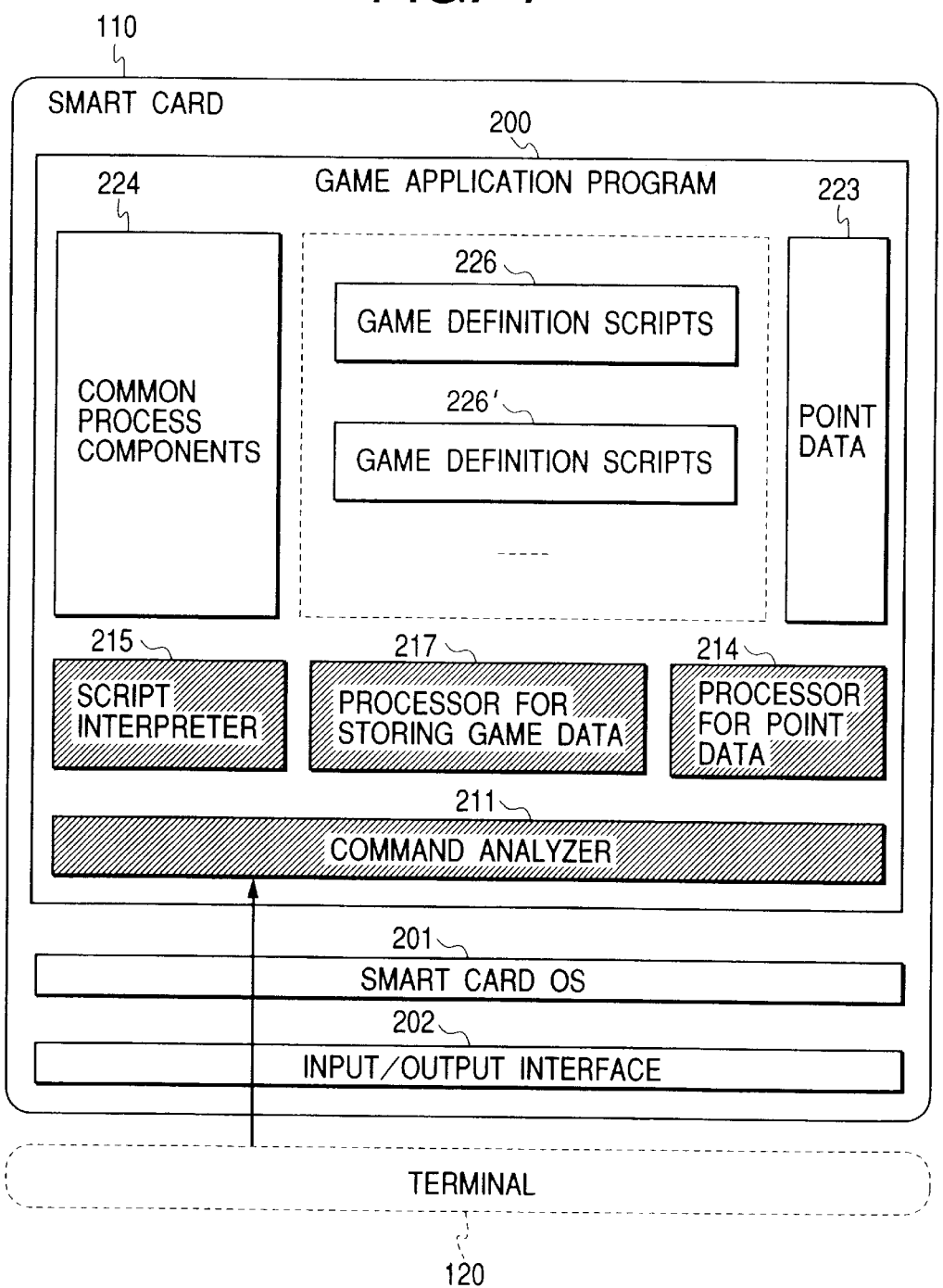
FIG. 7 is a diagram illustrating a specific smart card configuration for the game and point system concerned with a preferred embodiment of the present invention (fifth embodiment)

In FIG. 6 and FIG. 7 that follow, a method is proposed in which the replacing of a game type by another game type or the adding of another game type can be performed without being burdened by the application registration and authentication procedure and application replacement.

Specifically, game definition scripts supercede the definition of a component call (225) used in the game execution method for the card shown in FIG. 5, and a script interpreter for interpreting and executing the game definition scripts is provided in the processing part of the game application program. Separate suits of the scripts that are replaceable define different games and the interpreter practically interprets and executes each suit of the scripts.

FIG. 6 shows a smart card configuration with a game application being installed on the card, the application being programmed according to a method in which game definition scripts are described and executed by the interpreter. Here, again, the shaded portions are fixed components of the program that are predetermined.

In this example, game definitions and rights to play a game are handled as separate entities. In the same manner as for the examples shown in FIG. 1 to FIG. 5, the rights to play a game (222) and the point data (223) are processed by the processor for rights to play (213) and the processor for point data (214) in common for all types of games. The common process components (224) are predefined and the game definition scripts (226) define the algorithm for result judgement that differs for each game by describing a sequence in which these components are to be called.

These game definition scripts (226) are replaceable and a processor for exchanging game scripts (216) controls the loading/unloading of the scripts. Despite the fact that the strict application issue scheme is prescribed to assure smart card security, it cannot be denied that there is a possibility of safety loss due to the making of a game exchange in units of game definition scripts possible for simple and convenient game exchange. Within the application program, therefore, the following must be checked: that the game definition scripts to be stored are not falsified; that an authorized programmer has programmed the scripts; and that the game application has been granted permission to store the scripts. Specifically, a particular game issue scheme instead of the OS's application issue scheme must be provided within the application and the storing of game scripts must be controlled so that safe game scripts only will be installed on the card, based on this scheme. The processor for exchanging game scripts (216) fills this controlling role.

The rights to play a game (222) are data that defines how many times the card user can play what type of game and this data is stored into the card when the game is issued. When the card receives the commands for playing a game from the terminal, if the rights to play a game (222) exist, the script interpreter (215) interprets and executes the contents of the game definition scripts (226) for the game. When the game play finishes, the rights to play a game (223) are decremented by one, as explained for the fundamental card configuration. The card configured as shown in FIG. 6 can accommodate a plurality of game types by storing game definition scripts (226) for each game type into the game application on the card. In addition, under the control of the processor for exchanging game scripts (216), a game type can be replaced by another game type even after the application is loaded into the card.

For the smart card example shown in FIG. 7, which resembles the example shown in FIG. 6, the data on the rights to game a play is included in game definition scripts. That is, the game definition scripts (226) are programmed to include one right to play a game (may include a plurality of rights to play a game, not limited to one right). Once a game has been executed once (or two or more times corresponding to a predetermined playable game count) described in the game definition scripts, control means is required to delete the game scripts so that the same scripts can not be executed again thereafter. The rights to play a game and the game definition scripts are managed together under a single processor, namely a processor for storing game data (217). This processor also deletes game scripts that have been executed completely as well as stores game scripts sent from the terminal when the game is issued into the data area. Needless to say, the processor for storing game data (217) must perform the script safety check as the processor for exchanging game scripts (216) shown in FIG. 6 does.

Figure 8:
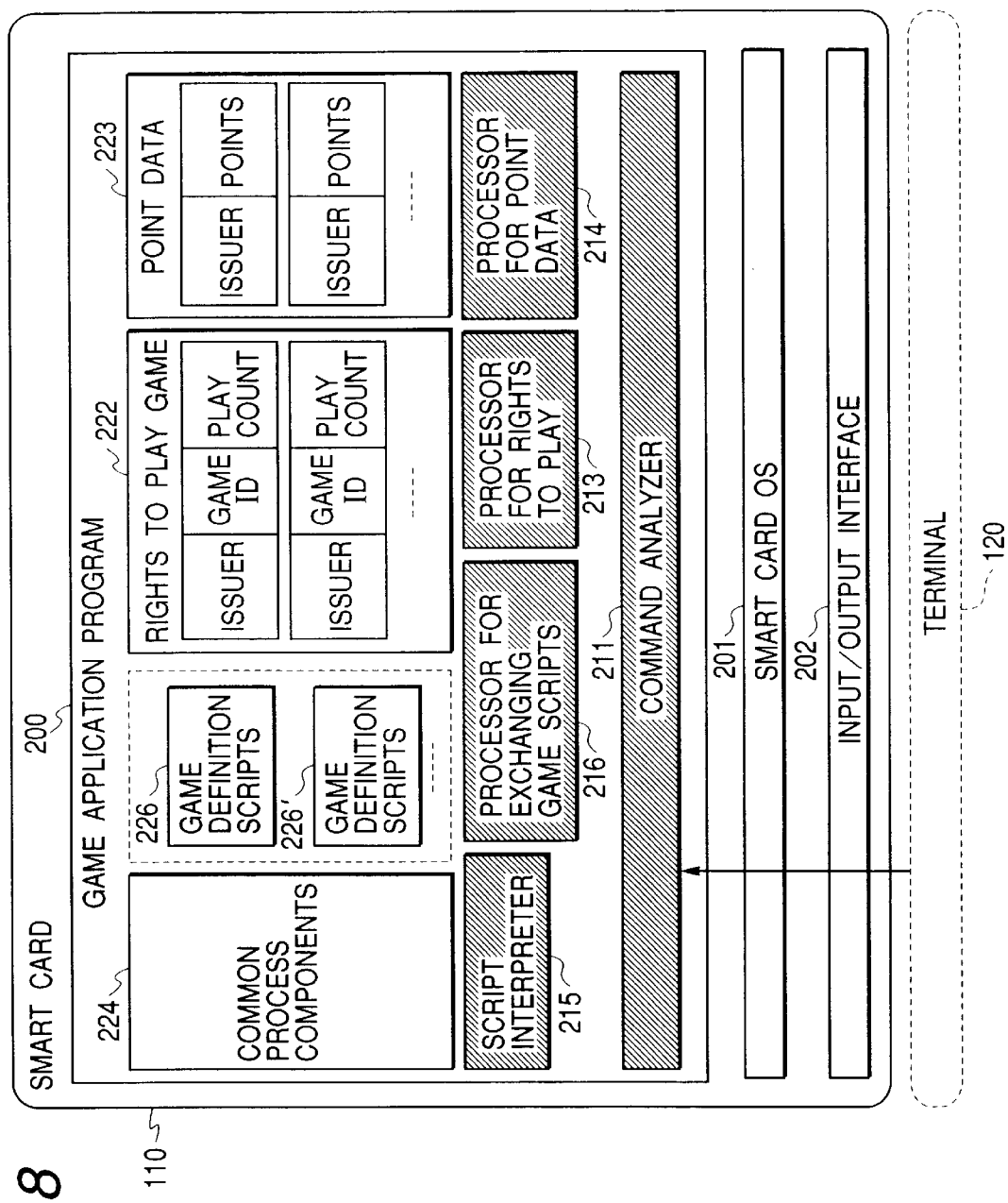
FIG. 8 is a diagram illustrating a specific smart card configuration for the game and point system concerned with a preferred embodiment of the present invention (sixth embodiment)

FIG. 8 shows a game application configured to adapt the game execution method for the card shown in FIG. 6 for a plurality of issuers of points. The rights to play a game (222) are stored, each data thereof comprising triple entries: issuer, game ID, and play count. Accordingly, points are stored per issuer in the storage area for point data (223). When the card receives the commands for playing a game sent from the terminal, the rights to play the game (222) are checked. For the game type for which the right to play remains, the script interpreter (215) executes the game, according to the game definition scripts (226). Following the game execution, points may be added to the point data (223) for the issuer of the game and the rights to play a game (222) for the issuer of the game that has just been executed are decremented by one.

This method involves application of the point system concept according to the above-mentioned application for patent filed as Japanese Patent Application No. Hei 10-307216, wherein the point data (223) is retained separately for a plurality of issuers, but is not unified. In this method, the card can accommodate not only a plurality of game types, but also a plurality of point service providers. Using this method, game service administrators can offer to shops a game application rental service which would expand the potential availability of game applications.

Figure 9:
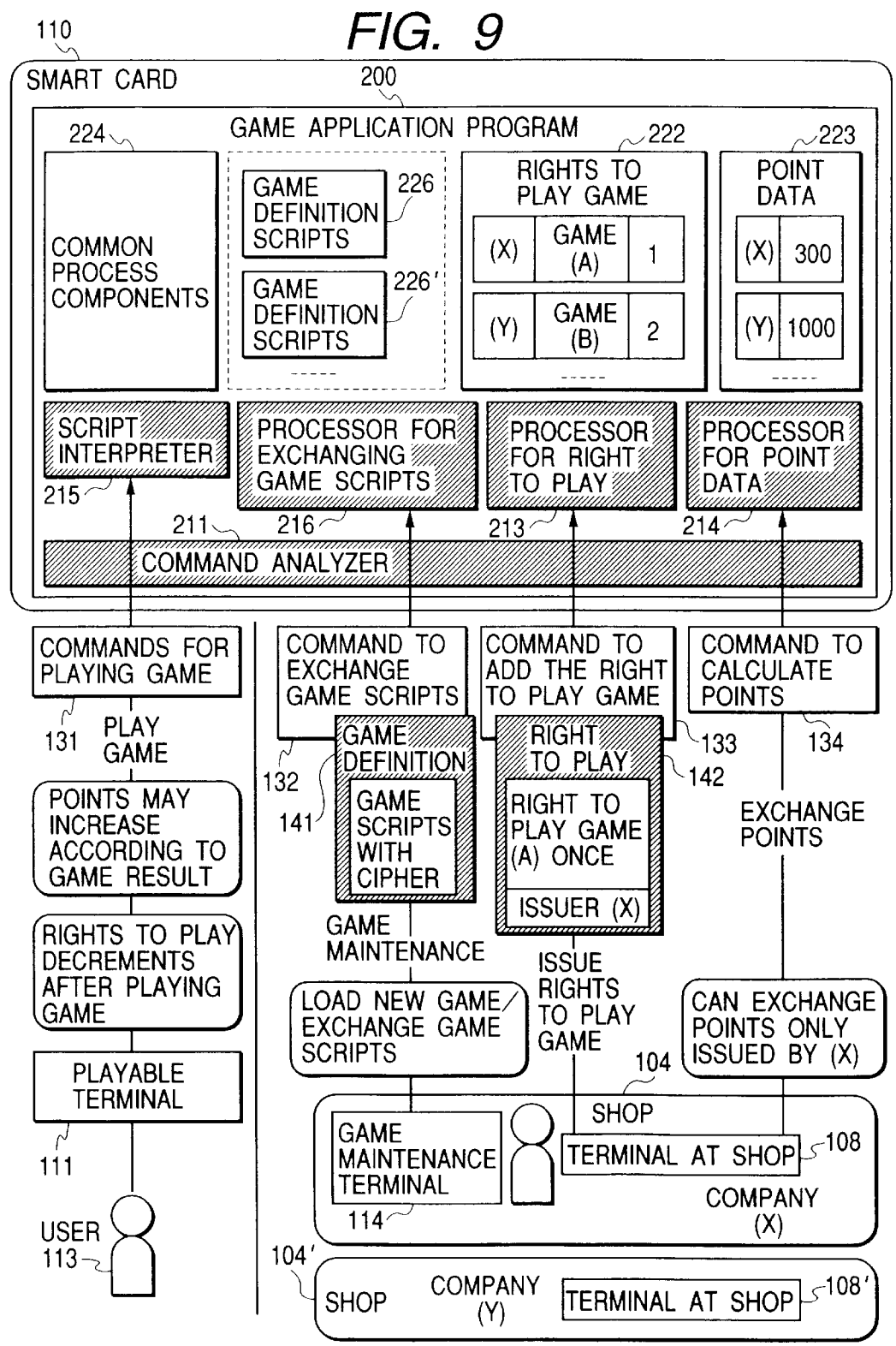
FIG. 9 is a diagram illustrating a first example of a game issue operation.
Figure 10:
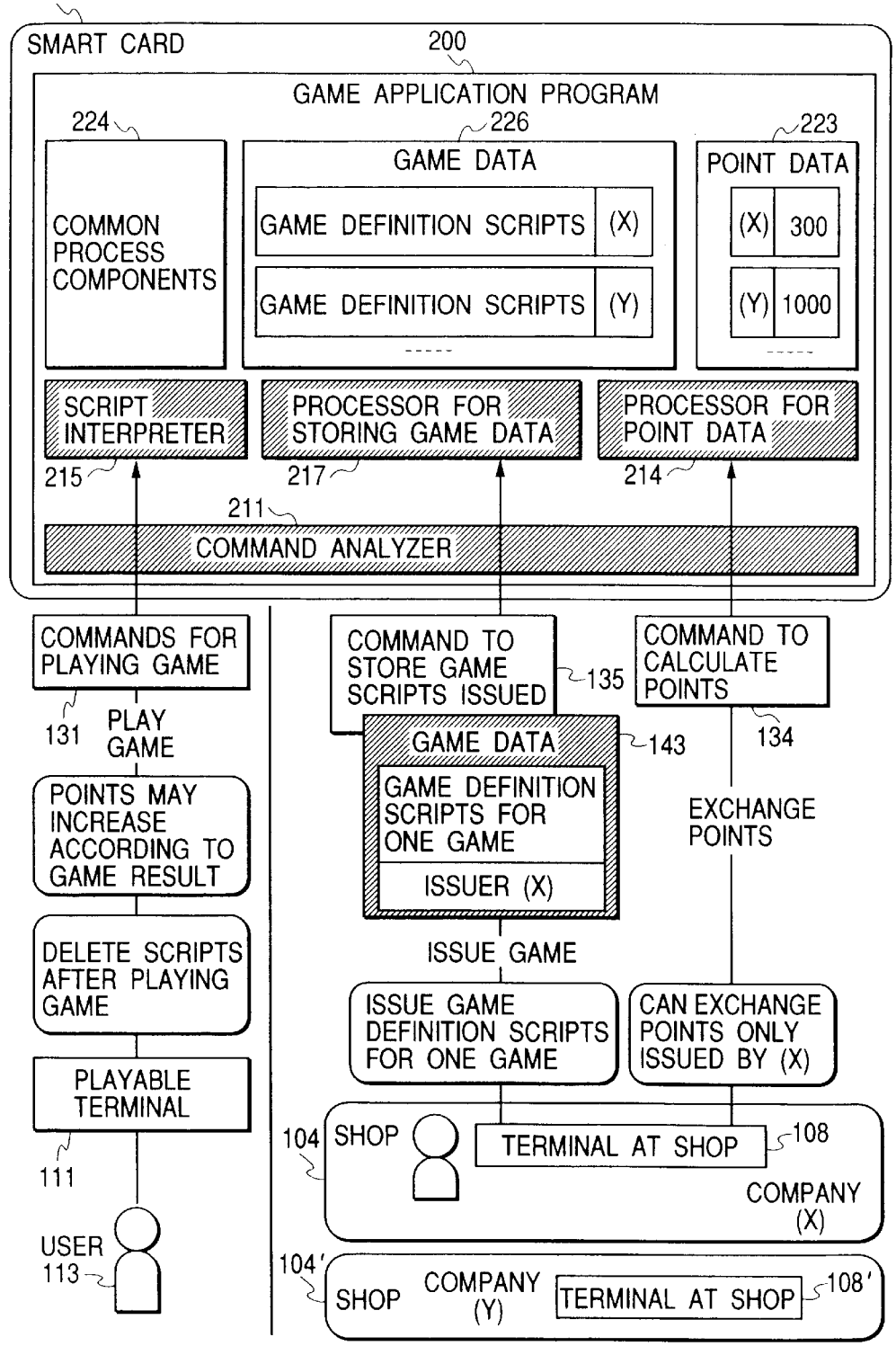
FIG. 10 is a diagram illustrating a second example of a game issue operation.

With reference to FIG. 9 and FIG. 10, now, system operation examples of the game and point system using either of the smart cards illustrated in FIG. 6 and FIG. 7 will be explained below. In the system operation example illustrated in FIG. 9 wherein the smart card shows in FIG. 6 is used, game definition scripts and rights to play a game are separate and game exchange is assumed to be performed at a suitable timing. In the system operation example illustrated in FIG. 10 wherein the smart card shown in FIG. 7 is used, game definition scripts and rights to play a game are put together and the scripts of a game are invalidated (deleted) whenever the game has been executed completely.

FIG. 9 is a diagram illustrating an example of the game and point system operation using the smart card on which a game application accommodating a plurality of games is installed. In this example, game definition scripts and rights to play a game are separate.

A game application program (200) is assumed to have been loaded into the smart card (110). The game application (200) comprises a command analyzer (211), a script interpreter (215), a processor for exchanging game scripts (216), a processor for rights to play (213), a processor for point data (214), and other components. Point data (223) is stored as points managed per issuer Company. Rights to play a game (222) are also managed per issuer and the game type and playable count per issuer are stored. Game definition scripts (226) are game contents defined by describing a sequence in which the common process components (224) are to be called. In fact, the script interpreter (215) interprets the contents of the scripts and executes the scripts. The game definition scripts (226) can be exchanged for new scripts as required.

The processing procedure for each phase of game exchange, game issue, game play, and exchanging points for a service will be explained below.

Game Exchange

From a game maintenance terminal (114) at a shop (104) or any other place, a command to exchange game scripts (132) and game definition data (scripts), (141) is sent to the smart card (110). Then, once the command analyzer (211) has interpreted the received command as a command to exchange game scripts (132), the processor for exchanging game scripts (216) executes the processing of game definition exchange. At this time, it must be assured that the game definition scripts received from the terminal have been issued from an authorized issuer because the scripts can rewrite the point data. For the assurance thereof, all game definition scripts (141) issued must include a cipher key that authenticates the authorized issuer of the scripts, the key being encrypted in accordance with the game issue scheme predefined within the application. According to the cipher key, the processor for exchanging game scripts (216) must perform authentication of the scripts it received. Furthermore, program exchange may be necessary on the terminal side when a new game is issued, because a terminal program appropriate for the new game is required on the game playable terminal (111) when the user plays the game.

Game Issue

According to how much the user paid for shopping or service at a shop (104) of Company (X), a terminal at the shop (108) sends the smart card (110) a command to add the right to play a game (133) and the right to play data (142). The right to play data (142) contains information that the user can play with the game (A) once and the issuer is Company (X) To assure safety, encryption is desirable for this data as well. The command analyzer (211) interprets the command and the processor for rights to play (213) adds the right to the rights to play game data (222).

Game Play

When the user (113) is playing a game, commands for playing the game (131) are sent to the smart card (110). If the rights to play the game (222) exist, the user can play the game of the appropriate type. Following the game play, the points retained in the point data (223) storage may increase, wherein the game result may update the points for the issuer of the rights to play a game included in the rights to play game data (222) for the game just executed. After the game play, the rights to play a game (222) are decremented by one. To enable game execution, a game executing terminal program appropriate for the game type within the smart card must exist in the game playable terminal (111).

Exchanging Points for a Service

Points accumulated as point data (223) while the card user has so far played games can be exchanged for a predetermined service at a shop (104). When the card user wants to exchange points for a service, a command to calculate points (134) is sent to the smart card (110) from a terminal at the shop (108) (that terminal maybe the same as the terminal from which rights to play a game are issued or it may be different from such terminal). The command analyzer (214) passes the processing control to the processor for point data (214) and the processor for point data (214) executes an operation for subtraction of points. If the shop (104) from where the command was sent belongs to Company (X), only the points issued by the Company (X) can be exchanged for a service.

In the system operation scheme illustrated in FIG. 9, the user can play games of as many types as the number of the suits of game definition scripts (226) (of course, only if the rights to play a game exist in the card). By replacing game definition scripts (226) with new scripts as required, the game application (200) can continue to offer a new game without being replaced.

FIG. 10 is a diagram illustrating another example of the game and point system operation using the smart card on which a game application accommodating a plurality of games is installed. In this example, game definition scripts and rights to play a game are unified. As is the case with the system operation example illustrated in FIG. 9, it is assumed that a game application program (200) has been loaded into the smart card (110). The game application (200) comprises a command analyzer (211), a script interpreter (215), a processor for storing game data (217), a processor for point data (214), and other components. Point data (223) is stored as points managed per issuer Company. A difference from the example shown in FIG. 9 is that game data (227) is stored, each data comprising a pair of game definition scripts and issuer information. Similarly, the script interpreter (215) executes game definition scripts by interpreting the contents of the scripts. A suit of scripts can be regarded as one right of the user to play a game. Game execution may rewrite only the point data (223) for the issuer of the game. Once the game has finished, the suit of the game scripts is invalidated by deleting it so that the game can not be executed again.

For this example, the processing procedure for each phase of game issue, game play, and exchanging points for a service will be explained below.

Game Issue

According to how much the user paid for shopping or service at a shop (104) of Company (X), a terminal at the shop (108) sends the smart card (110) a command to store game scripts issued (135) and game data (143) containing game definition scripts and the issuer. To assure safety, a cipher key that authenticates the authorized issuer of the scripts, encrypted in accordance with the predefined scheme, must be attached to the game data (143). According to the cipher key, the processor for storing game data (217) must perform authentication of the scripts it received. Furthermore, programs exchange may be necessary on the terminal side when a new game is issued, because a terminal program appropriate for the new game is required on the game playable terminal (111) when the user plays the game.

Game Play

When the user (113) is playing a game, commands for playing the game (131) are sent to the smart card (110). At this time, if the game data (227) exists, the user can play the game described in the game definition scripts. Following the game play, the points retained in the point data (223) storage may increase, wherein the game result may increase the points for the issuer included in the game data (222) for the game just executed. After the game play, the game data (227), the scripts of the game are erased so that the game can not to be executed again. To enable game execution, a game executing terminal program appropriate for the game type within the smart card must exist in the game playable terminal (111).

Exchanging Points for a Service

Points accumulated as point data (223) while the card user has so far played games can be exchanged for a predetermined service at a shop (104). When the card user wants to exchange points for a service, a command to calculate points (134) is sent to the smart card (110) from a terminal at the shop (108) (that terminal maybe the same as the terminal from which rights to play game are issued or it may be different from such terminal). The command analyzer (214) passes the processing control to the processor for point data (214) and the processor for point data (214) executes an operation for subtraction of points. If the shop (104) from where the command was sent belongs to Company (X), only the points issued by the Company (X) can be exchanged for a service.

In the system operation scheme illustrated in FIG. 10, because every game data (227) includes game definition scripts, there may exist duplicated suits of scripts in the card if a plurality of the same type of games are stored, which may be considered inefficient. However, the flexibility of game type selection increases as compared with the example illustrated in FIG. 9 wherein game definition scripts are replaced by new scripts as required. Because issuing the right to play a game means issuing a new game, the game application (200) can continue to offer a new game without being replaced. Whenever a new type of game is developed, however, the associated program for playing the game on the terminal needs to change. In a situation where game playable terminals are distributed, updating the programs on the terminals is likely to be time-consuming work.

Figure 11:
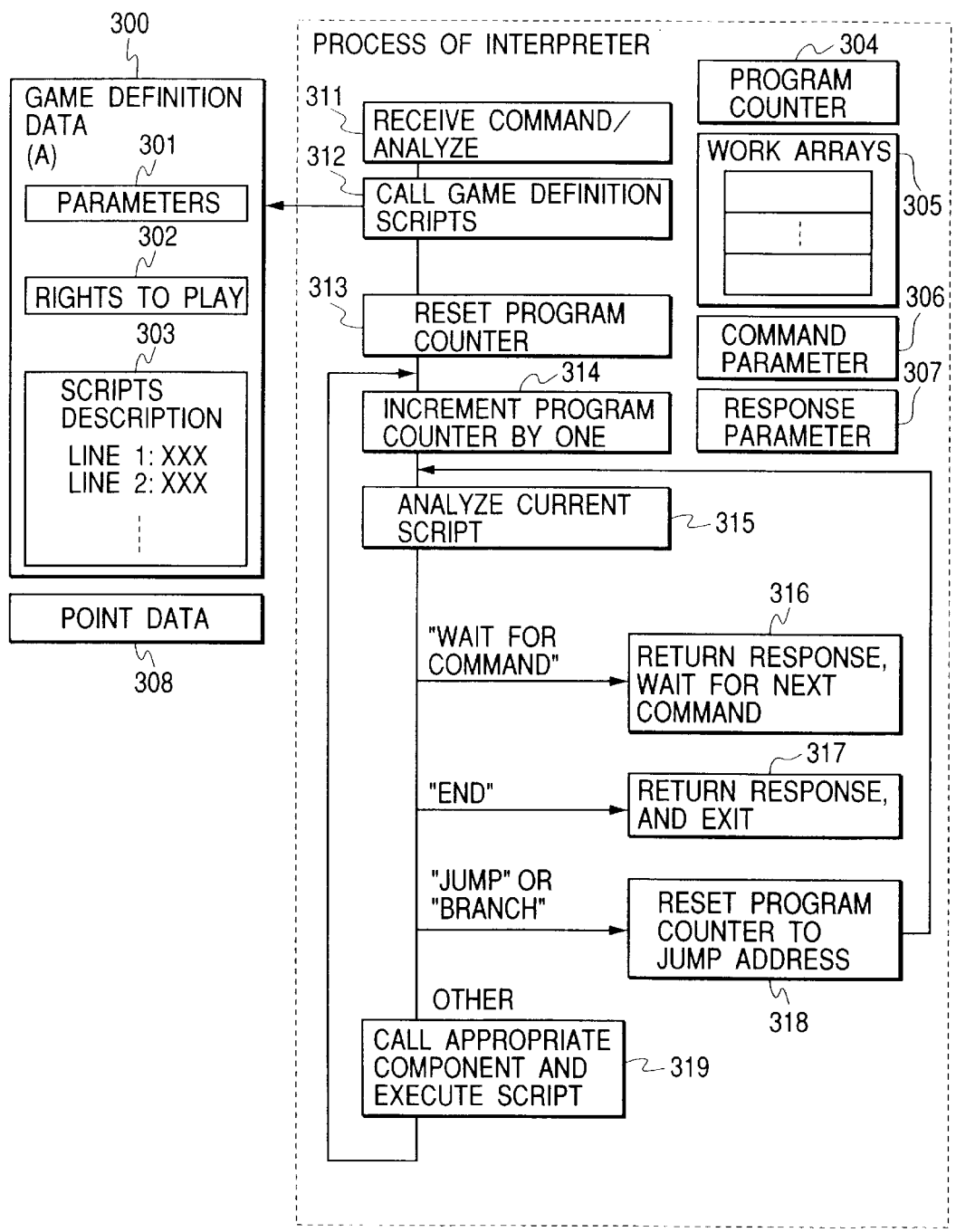
FIG. 11 is a block diagram illustrating the processing of the script interpreter.

Next, the flow of processing of the script interpreter will be explained with reference to FIG. 11. In the game definition data (300) area, parameters (301), rights to play (302), and scripts description (303) are stored. Separate from the game data, point data (308) exists.

The script interpreter has a program counter (304) as a local variable and work arrays (305) and is able to read a command parameter (306) sent from the terminal and to rewrite a response parameter (307) to be returned to the terminal.

When a command is sent to the smart card from the terminal, the script interpreter receives and analyzes the command from the terminal (311), and selects the specified game type (i.e., it calls the specified game definition scripts) (312). At this time, the interpreter stores a parameter included in the received command as the command parameter (306).

The interpreter resets (313) the program counter (304) and begins to execute the game scripts. The interpreter executes, in order, the scripts described in the scripts description (303) part; and, it basically increments the program counter one by one (314) while it analyzes the scripts in order (315) and calls appropriate common process components, thereby executing the scripts. If the interpreter encounters a "wait for command" script, it immediately returns a response to the terminal and awaits the next command reception (316). If the interpreter encounters an "end" script, it returns a response to the terminal and exits from the script execution process (317). If the interpreter encounters a script in which a jump or a branch is specified, it resets the program counter to the jump address and proceeds to analyze the next script (318). If the interpreter encounters any other script, it calls the appropriate common process component associated with the script and actually executes the script (319), and then it returns to the step of incrementing the program counter by one (314). During the script execution (319), the interpreter reads a value of the command parameter (306) while it updates the value in the work arrays (319) and the value of the response parameter (308). By continuing this processing, the game application is run.

FIG. 12 illustrates an example of scripts describes in a language to call common process components. Here, array [ ] is one of the work arrays (305), cmd [ ] denotes a command parameter (306), and rsp [ ] denotes a response parameter (307). Each script operates to call one common process component and fills the role of running the application program. Up to three parameters are assigned to one script.

In this example, scripts are described in a likely usual programming language to facilitate understanding. Considering that the scripts are executed on a smart card with a small storage capacity, a more specialized language may be suitable for describing the scripts limited to a game application (for example, representation in byte strings, each byte consisting of fewer bits). A method may be used in which any compiling means is prepared on the terminal side from which scripts are issued to translate scripts into those represented in byte strings and the translated scripts are issued.

With reference to FIGS. 13 through 19, examples of three types of games that the program application can offer will be given below, wherein game definitions are represented by using the scripts defined in FIG. 12.

Figure 13:
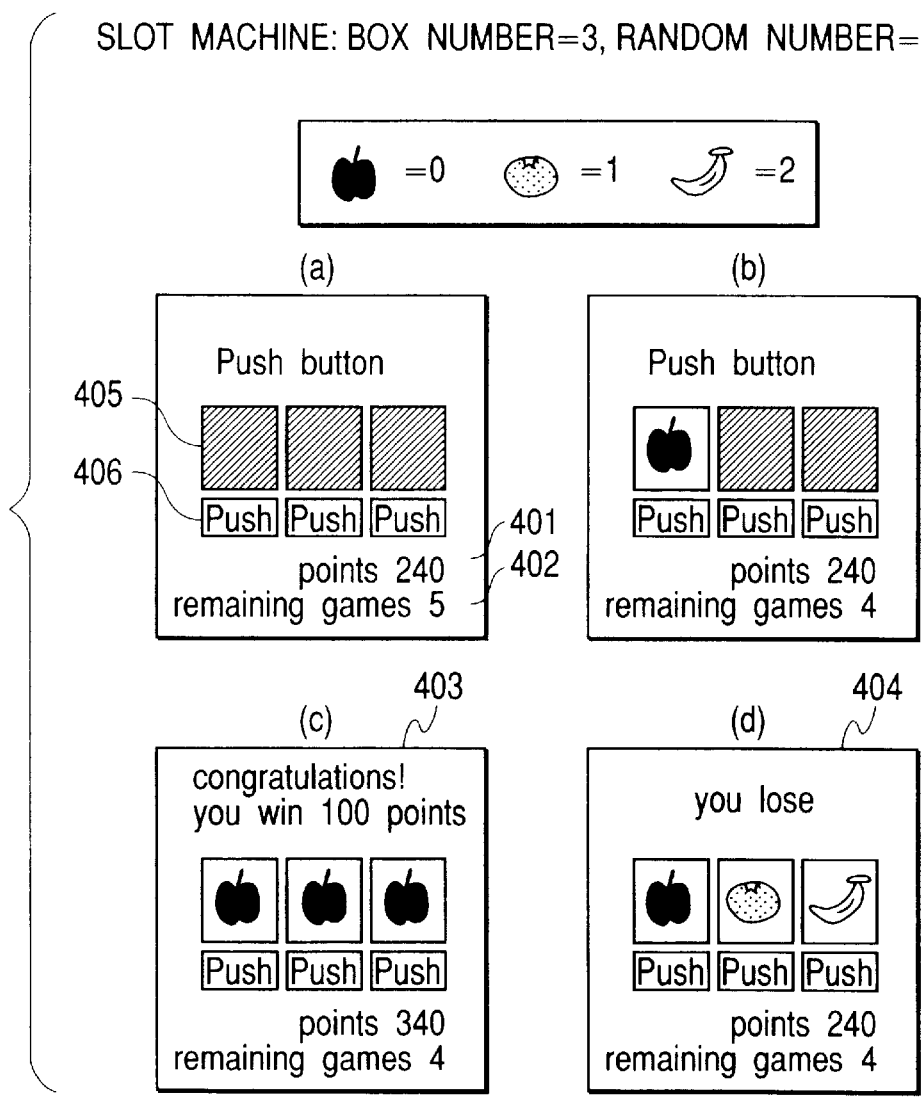
FIG. 13 is a diagram which illustrates an example of a slot machine game.

FIG. 13 shows examples of slot machine game play screens appearing on the game playable terminal, wherein three boxes (corresponds to three random numbers) are shown and a range of settable values for a random number represented in one box is 0 to 2. The values settable in each box correspond to three fruit symbols: "1" for an apple symbol, "2" for an orange symbol, and "3" for a banana symbol.

The game begins with screen (a). The current points (401) and remaining games (402) that the user can play are shown and values in three boxes (405) are not fixed yet with the reels rotating on the screen as depicted. The user pushes the three "Push" buttons (406) one by one. By each button push, a command to generate a random number is sent to the card and the symbol corresponding to a fixed value of the random number is displayed in the box.

Screen (b) is an example of a screen which appears after the first user choice by operation of the "Push" button, whereby a random number of "0" is assumed to be generated in the card and the apple symbol is displayed in the corresponding box. This is repeated three times.

Screen (c) is an example of a screen which appears after the third user choice by operation of the "Push" button, when one game is over (the user wins). Because of matching of the symbols in the three boxes, a message (403) appears, indicating that the game result is "you win" and "100" points which the user gained in the game are added to the points. The points increase accordingly.

Screen (d) is another example of a screen after the third user choice by operation of the "Push" button, when one game is over (the user loses). Because of mismatching of the symbols in the three boxes, a message (404) appears, indicating that "you lose" and no points are added.

FIG. 14 shows an example of the scripts description for the slot machine game shown in FIG. 13, described by using the scripts in FIG. 12. The game is represented in 18 lines of scripts, lines 00 to 11 (binary).

Lines 00 to 02: To be called upon the first "Push" button push. One random number is generated and stored into a work array and the fixed value of the random number is returned. To return the operation result to the terminal, a "Return" script is defined.

Lines 03 to 05: To be called upon the second "Push" button push. One random number is generated and stored into a work array and the fixed value of the random number is returned.

Lines 06 to 08: To be called upon the third "Push" button push. One random number is generated and stored into a work array. A value to indicate "the last" is placed in the response and the processing proceeds to result judgment.

Lines 09 to 11: Result judgment. If the stored values of three random numbers all match, predetermined points are added to the current points. Finally, the result is returned to the terminal and the processing terminates.

Figure 15:
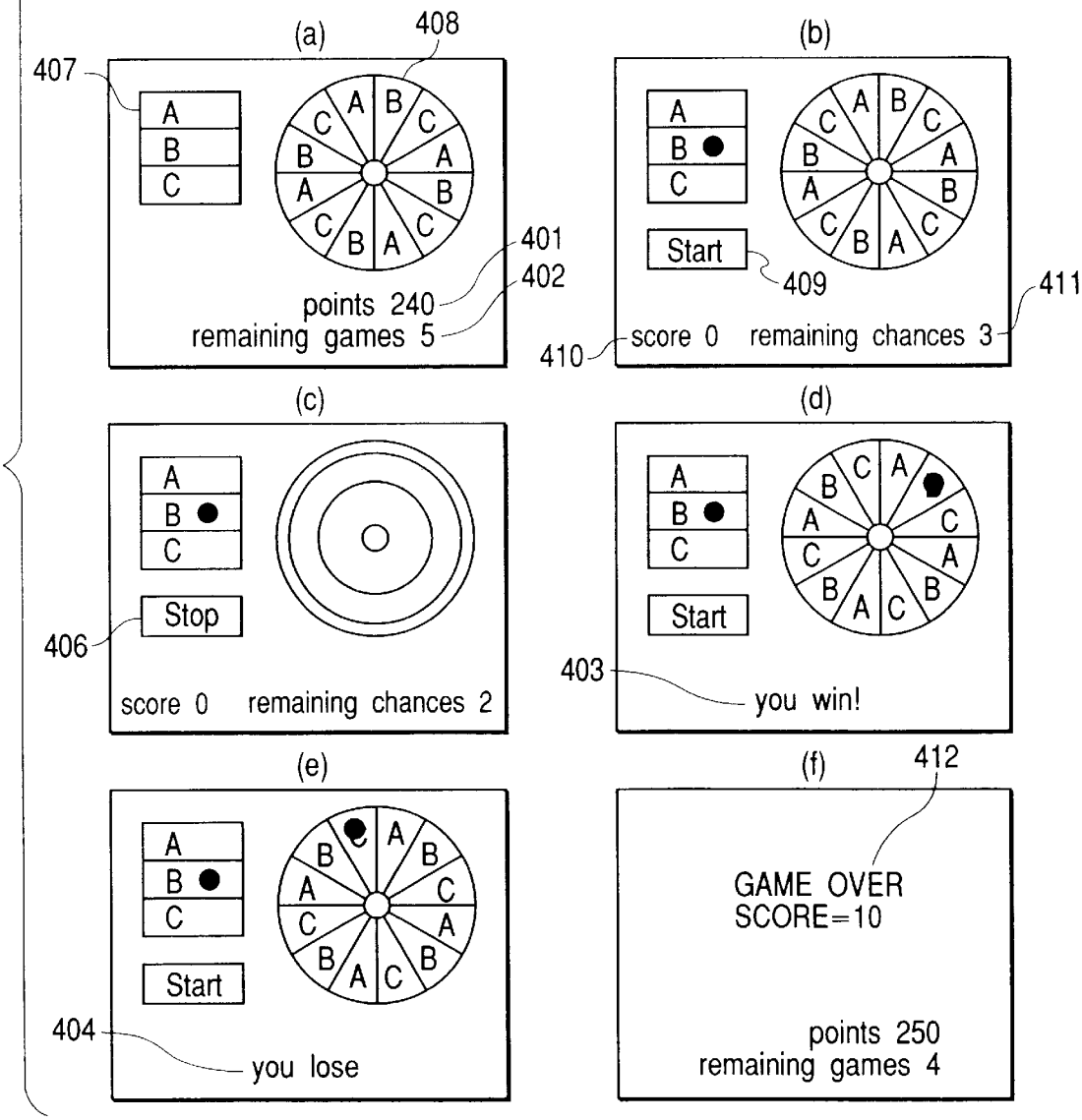
FIG. 15 a diagram which illustrates an example of a roulette game.

FIG. 15 shows examples of roulette game play screens appearing on the game playable terminal, wherein the win probability is one third and the user is given three betting chances. Three possible values of random numbers correspond to "A," "B," and "C." Illustration in color might be easier to see, though it is not presented here.

Screen (a) is the initial screen. The current points (401) and remaining games (402) that the user can play are shown. To begin the game, the user will choose one of the betting places (407) A,", "B," and "C" before the roulette (408) rotates.

Screen (b) is a screen that appears, following the game start. Here, the user is assumed to have chosen "B" out of the three betting places (407) and a bullet is placed in the B box. Score (410) and remaining chances (411) are shown. Because the user is given three betting chances for this game, "3" is shown as the remaining chances (411). When the roulette starts to run as the user pushes the "Start" button (409), the remaining chances (411) are decremented by one.

Screen (c) is a screen wherein the roulette (408) is rotating (this state appears on the screen, while the program on the card side waits for a command input). When the user pushes the "Stop" button (to stop the roulette rotation) (406), the associated command is issued to the smart card.

Screen (d) is a screen showing the result when one roulette run is over According to the value of the random number generated in the card, that is, if there is a match between the bet place chosen and the value, a "You Win" (403) message appears and the score increases.

Screen (e) is a screen which shows the result when one roulette run is over and you lose. A "You lose" (404) message appears and the score does not increase.

One game ends with screen (f) after three roulette runs with a random number generated. A "GAME OVER" message and the score count are displayed (412).

FIG. 16 shows an example of the scripts description for the roulette game shown in FIG. 15, described by using the scripts in FIG. 12. The game is represented in 27 lines of scripts, lines 00 to 1a (binary).

Lines 00 to 05: To be called upon the first "Stop" button push. The user-input value received as a command parameter is stored into a work array and compared with a random number generated and the result of comparison is stored into another array. The comparison result and the value of the random number are returned to the terminal.

Lines 06 to 0b: To be called upon the second "Stop" button push. The user-input value received as a command parameter is stored into a work array and compared with a random number generated and the result of comparison is stored into another array. The comparison result and the value of the random number are returned to the terminal.

Lines 0c to 10: To be called upon the third "Stop" button push. The user-input value received as a command parameter is stored into a work array and compared with a random number generated and the result of comparison is stored into another array.

Lines 11 to 1a: Result judgment. According to the three comparison results, points are added to the current points. Finally, the result is returned to the terminal and the processing terminates.

FIG. 17 shows examples of shooting game play screens, wherein five boxes appear and the user is given five chances to play. The user clicks at one of the boxes to hit the target that moves at random, appearing in any box for a second. If the target appears in the box, at which the user clicked, the user wins. Clicking can be repeated five times.

Screen (a) is the initial screen. The current points (401) and remaining games (402) that the user can play are shown. To begin the game, click the "Start" button (409).

Screen (b) is a screen which shows the state before the user clicks at a box on the screen. In any of the five boxes (405), the target symbol (413) appears at random. The target position changes, according to the value of a random number that is generated per second. In the screen, the current game score (410) and remaining chances (411) to play are displayed.

Screen (c) is a screen which shows the state when the user clicks at a box on the screen. In this case, because the target appears in the box that the user has chosen, a "click—hit" (414) message appears and 10 points are added to the score.

Screen (d) is another screen which shows the state when the user clicks at a box on the screen. If the box that the user has chosen differs from the box where the target appears, a "click—lose" (415) message appears.

The game ends with screen (e). When the user finishes using five play chances, a "GAME OVER" message and the score count are displayed (412). If the count of the remaining games (402) is other than 0, a new "Start" button (409) appears.

Figure 18:
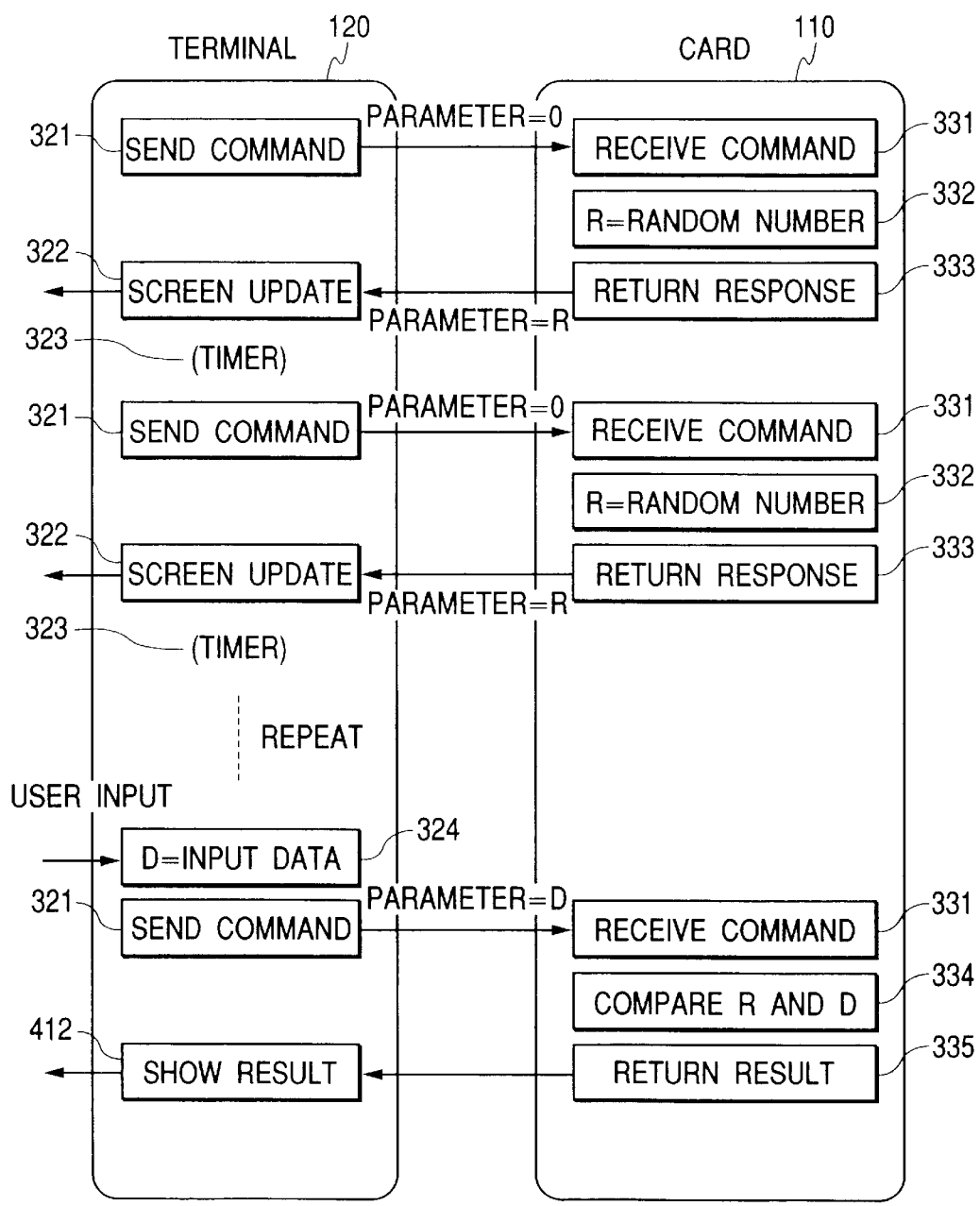
FIG. 18 is a functional diagram which illustrates an example of the processing procedure of the shooting game.

FIG. 18 illustrates the processing procedure between the terminal (120) side and the card (110) side regarding the shooting game shown in FIG. 17. In this procedure, which is the same for other programs on the smart card, basically, the terminal (120) sends the card a command and a parameter and the card (110) executes processing in accordance with the received command and returns a response to the card. Because the smart card on which the current version of MULTOS and other OSs are installed does not have a built-in clock (the operation on the card side is triggered by command reception from the terminal), a request for generating a random number must be sent per second from the terminal in order for the card to generate a random number per second to update the screen.

First, the terminal (120) sends a command (parameter=0) (321) that requests the card to generate a random number.

The card (110) receives the command (331), generates a random number in the value range corresponding to the number of boxes, assigns the random number to a variable R (332), and sends a response with parameter=R back to the terminal (333). The terminal receives the response and updates the screen (322), according to the value of R. Based on a one-second timer (323), the above command-response process (from sending a command 321 until screen update 322) is repeated at intervals of one second.

When an input from the user (clicking at a box) occurs, the box number that the user has chosen is assigned to variable D (324) and the terminal sends a command with parameter=D (321). The card receives the command (331) and compares the last generated random number R that has been stored with the received box number D (334). If a hit is found by this comparison, points are added and the result of the comparison is returned to the terminal (335). The terminal receives the result and shows the result on the screen (412). The above process is repeated according to the number of chances to play (five times in the example shown in FIG. 17).

FIG. 19 shows an example of the scripts description for the shooting game illustrated in FIGS. 17 and 18, described by using the scripts in FIG. 12. If the command parameter is "0", a random number is generated. Otherwise, the user input is compared with the value of the last generated random number. Unlike the preceding examples of game scripts, this example of scripts includes a loop.

Lines 00 to 02: Work arrays are initialized.

Line 03: The beginning of the loop

Line 04: Branching occurs, according to the value of the command parameter.

Lines 05 to 0d: When a value other than "0" is given as the command parameter, the user-input value is compared with the value of the random number and the result of comparison is stored. The loop counter is incremented by one. Unless the loop counter indicates the last time, the result of the comparison is returned to the terminal. After passing the processing control to the terminal, next time it returns, the processing returns to the beginning of loop (line 03). Lines 0e to 11: Following the last loop execution, points are added to the point count, based on the stored results of comparison. Lines 12 to 16: If the command is a dummy, a random number is generated and returned to the terminal. The processing returns to the beginning of the loop. By repeating the above, the processing illustrated in FIG. 18 can be implemented.

As described above, by using the scripts given in FIG. 12, a plurality of types of games, such as the three games given as examples, can be defined. The foregoing three game scripts are examples and many types of games can be defined by describing the processes of generating a random number and comparing the random number with the input from the user in combination. The script interpreter executes these games defined in script descriptions as illustrated in FIG. 11, so that one application program can offer a plurality of types of games that can be selectively executed.

Although the above-described explanation relates to a game application program and its operation enabling a plurality of types of games to run on the smart card, this method can be applied to applications other than games. The present invention can be applied to application software for, e.g., a questionnaire system in which the user can get points by answering questionnaires, which are updated after being answered, as shown on the screen; and an advertisement system in which the user can get points by reading a specific advertisement. Such an application generates a value such as points in response to user operation and controls the contents so that the same suit of scripts will never be executed again. For this purpose, questionnaire answer logs and advertisement reading logs for each user must be stored in the card and control is required to prevent same scripts of a questionnaire or advertisement from being loaded into the card a plurality of times. For game scripts, once a suit of scripts has been executed, it is deleted or the rights to play a game are decremented by one, which is only required for script management. For questionnaire scripts, an additional requirement is that the shop side collects the answer data.

Figure 20:
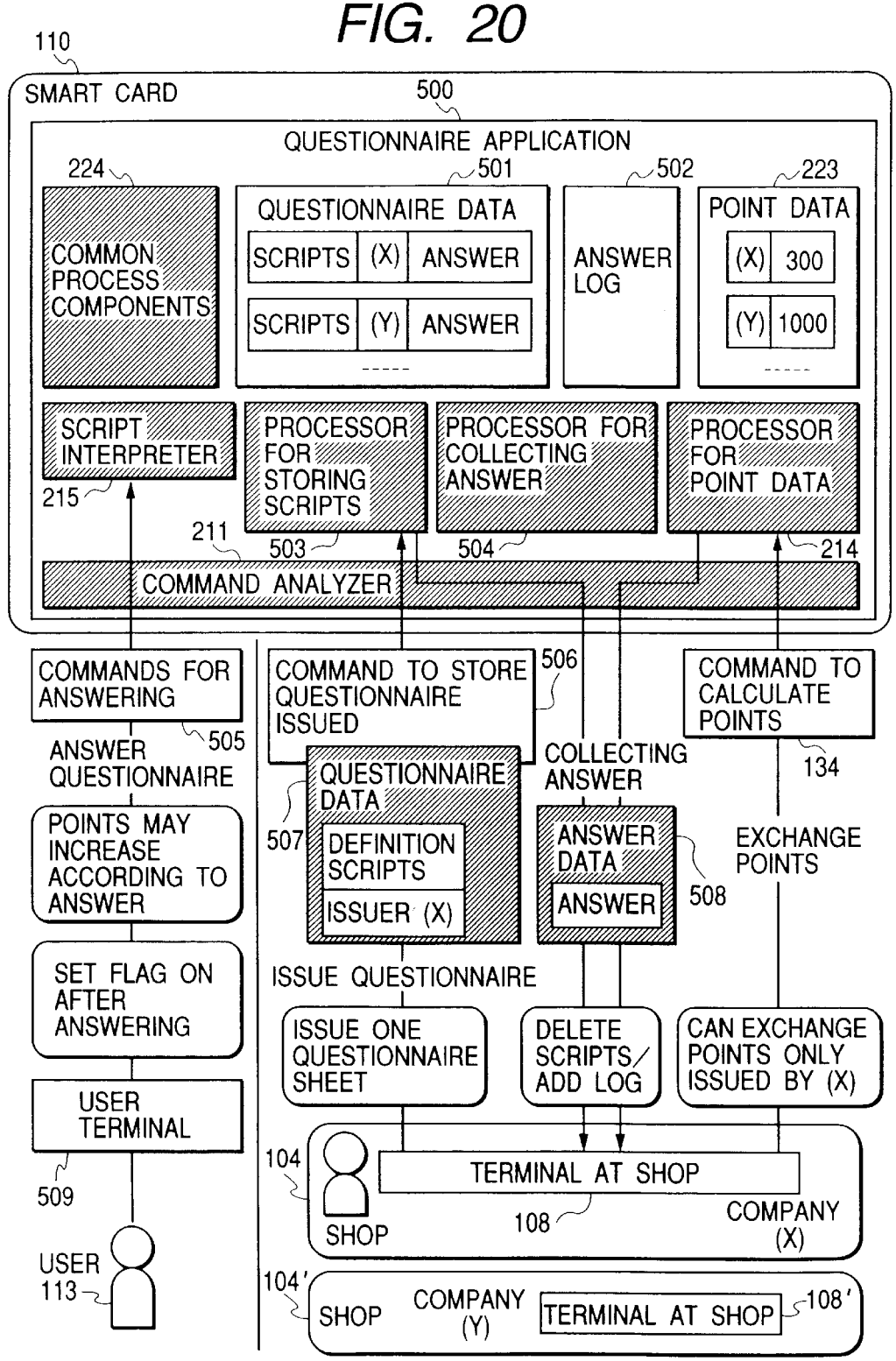
FIG. 20 is a diagram illustrating an example of questionnaire system operation.

FIG. 20 shows an example of a questionnaire system operation to which the present invention is applied. This example is essentially similar to the game system operation example illustrated in FIG. 10, except that the questionnaire answer data is collected.

A questionnaire application (500) is assumed to have been loaded into the smart card (110). This questionnaire application (500) comprises a command analyzer (211), a script interpreter (215), a processor for storing scripts of a questionnaire (503), a processor for point data (214), and other components. Questionnaire data (501) is stored, each data comprising triple entries: questionnaire scripts, issuer, and answer data. The answer data entry is blank before the user answers the questionnaire that is currently presented. When the user answers the questionnaire, the answer data is stored into place. This answer data entry also fills the role of a flag to indicate whether the user has answered the questionnaire. When this entry contains data, the same suit of questionnaire scripts cannot be executed again. Logs of answers to questionnaires are stored as an answer log (502) data to control script loading so that any questionnaire once answered will never be loaded again. As is the case in FIG. 9 and FIG. 10, point data (223) is stored as points managed per issuer Company.

At a shop (104) of Company (X), a terminal at the shop (108) sends the smart card (110) a command to store a questionnaire issued (506) and questionnaire data (507) containing questionnaire definition scripts and the issuer. As is the case with game scripts, it must be assured that this data has been issued from the authorized issuer. For this purpose, a cipher key that authenticates the authorized issuer of the scripts, the key being encrypted in accordance with a predefined scheme, must be attached to the questionnaire data. According to the cipher key, the processor for storing scripts of the questionnaire (503) must perform authentication of the scripts it has received. The processor for storing scripts of the questionnaire (503) also checks to see whether the questionnaire data (507) it has received has been answered by referring to the answer log (502) database, thereby performing the function of control over scripts to prevent answered questionnaire scripts from being stored into the questionnaire data (501) database.

When the user (113) answers a questionnaire at the user terminal (509), commands for answering (505) are sent to the smart card (110). If the questionnaire data (501) exists, the user can answer the questionnaire described in the questionnaire definition scripts. The questionnaire contents, not only requesting the user to answer straightforwardly, are elaborated so that the user can select the level of detail of an answer, and the next questionnaire contents will change according to the answer to the preceding question. Once the user has answered the questionnaire, points weighted in accordance with the answer are added to the point data (223) for the issuer of the questionnaire and the answer data is added to the questionnaire data (501) database in a place coupled with the scripts. The questionnaire data (501) complete with the scripts and the answer data cannot be answered again. Adding answer data to the answered questionnaire data (501) operates, in other words, to invalidate the questionnaire data.

When points are exchanged for a service at a terminal at the shop (108) or the next questionnaire of the same issuer is issued, the answer data to the previously answered questionnaires must be collected. Because the answered questionnaire scripts coupled with answer data are retained in the invalid state, questionnaire data (501) overflow is likely to occur if answer data is accumulated without being collected. Thus, collecting answer data at a suitable timing is required. When a request for collecting answer data is issued to the card, the processor for collecting an answer (504) encrypts answer data and returns it to the terminal (108). At the same time, the above processor erases the questionnaire data (501) for the scripts for which the answer data is lost and adds log information for the lost answer data to the answer log (502) database.

In the way described above, the application of the present invention can be expanded to cover a questionnaire system, and is not only applicable to games. Furthermore, the invention can be applied to an advertisement reading system in a similar way.

How the present invention which can be preferably embodied as explained above produces effects will be described in detail for each of the six major components of the invention, as specified in the discussion of "Means for Solving the Problems."

On the smart card that can be embodied as a preferred embodiment of the present invention with (1) An application program comprising the following elements:
  a) Game executing components
  b) Storage for game-definition scripts
  c) Script interpreter
  d) Storage and processor for point data
  e) Storage and processor for rights to play game
  f) Command analyzer One application program installed on the smart card can offer a plurality of types of games that can be selectively executed.

In addition, (2) Processor for storing game definition scripts The processor enables the introduction of a new type of game at any time even after the game application program is loaded into the smart card without being accompanied by application program exchange. Consequently, a more flexible game system can be provided.

The above processor controls storing game scripts, based on the game issue scheme prescribed in the application program, so that the processing parts of the application program can be changed in safety. This means the release from troublesome and time-consuming tasks accompanied by meeting the application issue scheme prescribed in the card OS.

Once the game application program for executing common processes has been loaded into smart cards on which different OSs are installed, such as "MULTOS" and "Java Card," programmers can program new games that are compatible on these cards without caring about the difference between the OSs.

(3) Function of point management per issuer enables the management of a plurality of types of games that are issued from a plurality of different issuers within one application. Consequently, a game system that is used more widely can be provided.

On the terminal device for operating with the smart card in question (4) Function of issuing a game (6) Function of calculating points These functions make it possible for a plurality of types of games to be issued to the smart card without being accompanied by game application program exchange and a flexible game system including point management can be operated in safety.

Equipped with the user interface for playing games (5) Function of executing a game The function allows the user to enjoy playing a game while the user can get points.

According to the present invention that can be preferably embodied as described herein, therefore, game applications for more flexible use can be introduced into a smart card system in safety. An increase of points linked with game results motivates the user to use the card more often and is effective for getting more customers from the viewpoint of the application provider. Furthermore, the present invention is significantly useful for making smart card systems popular.

Noticeable features of the present invention include the introduction of game definition scripts and a script interpreter and a method of control over storing scripts, based on the game issue scheme prescribed in the application program installed on the card. The invention provides a script loading/unloading method in which the contents of only the part for processing that is dependent on user input in a program, not limited to game application, is replaced by new contents without being accompanied by program exchange. This script loading/unloading method enables the development of more flexible and convenient smart card applications, which is released from platform restrictions.

The present invention makes it possible to replace game scripts in a program installed on a smart card by new game scripts without being accompanied by program exchange.

Technical items in connection with the present invention are listed below.

1. An application program that can run under an operating system (OS) installed on a smart card furnished with a storage means and an input/output interface and includes an interpreter for interpreting and executing scripts described to define the operating procedure of the application program.
2. The application program described in item 1, wherein the smart card includes point data storage for storing points the card user has gained, the count of which may be updated by the result of program execution in accordance with the run procedure defined in scripts.
3. The application program described in item 1, wherein processing defined in scripts can generate different results, according to the input by the user of the smart card and the timing of execution thereof, and the user cannot predict the result of processing in advance.
4. The application program described in item 1, including a function that, following the execution of processing defined in scripts, invalidates those scripts and sets the processing so that it is impossible for them to be used again.
5. The application program described in item 1, including storage of rights to execute scripts, defining the maximum number of times the processing defined in scripts can be executed, and a function that, immediately following the execution of processing defined in scripts, decrements the count of the rights to execute those scripts by one.
6. The application program described in item 1, configured such that scripts can be stored into the storage means through the input/output interface after the application program is loaded.
7. The application program described in item 1, including an authentication handler that performs a predetermined authentication procedure to assure that valid scripts, free of falsity, are stored when scripts are stored into the storage means through the input/output interface after the application program is loaded.
8. The application program described in item 2, including a function that adds up points per script issuer, attaches the identifier of the issuer to the scripts or the rights to execute scripts, and just after processing defined in the scripts is executed, updates only the points associated with the issuer of the scripts, according to the result of the processing.
9. A storage medium holding an application program that can run under an operating system (OS) installed on a smart card furnished with a storage means and an input/output interface and includes an interpreter for interpreting and executing scripts described to define the operating procedure of the application program.
10. The storage medium described in item 9, wherein the smart card includes point data storage for storing points the card user has gained, the count of which may be updated by the result of program execution in accordance with the operating procedure defined in scripts.
11. The storage medium described in item 9, wherein processing defined in the scripts can generate different results, according to the input by the user of the smart card and the timing of execution thereof, and the user cannot predict the result of processing in advance.
12. The storage medium described in item 9, including a function that, following the execution of processing defined in scripts, invalidates those scripts and sets the processing so that it is impossible for them to be used again.
13. The storage medium described in item 9, including storage of rights to execute scripts, defining the maximum number of times the processing defined in scripts can be executed, and a function that, immediately following the execution of processing defined in scripts, decrements the count of the rights to execute those scripts by one.
14. The storage medium described in item 9, configured such that scripts can be stored into the storage means through the input/output interface after the application program is loaded.
15. The storage medium described in item 9, including an authentication handler that performs a predetermined authentication procedure to assure that valid scripts, free of falsity, are stored when scripts are stored into the storage means through the input/output interface after the application program is loaded.
16. The storage medium described in item 10, including a function that adds up points per script issuer, attaches the identifier of the issuer to the scripts or the rights to execute scripts, and just after processing defined in scripts is executed, updates only the points associated with the issuer of the scripts, according to the result of the processing.
17. A terminal device capable of operating with a smart card furnished with a storage means and an input/output interface, including a means to load an application program that can run under an operating system (OS) installed on the smart card and includes an interpreter for interpreting and executing scripts described to define the run procedure of the application program into the smart card via the input/output interface.
18. A terminal device capable of operating with a smart card furnished with a storage means and an input/output interface, including a means to load scripts as part of an application program from outside via the input/output interface into the smart card wherein the application program that can run under an operating system (OS) installed on the smart card and includes an interpreter for interpreting and executing scripts described to define the operating procedure of the application program is stored in the storage means.

As many apparently widely different embodiments of this invention may be made without departing from the spirit and scope thereof, it is to be understood that the invention is not limited to the specific embodiments thereof except as defined in the appended claims.

What is claimed is:

1. A method of loading scripts into a smart card having storage means, an input/output interface, and an application program that can run under an operating system (OS) installed on the smart card, said method comprising:
   wherein said application program includes an interpreter for interpreting and executing scripts which describe and define a sequence of executing components which are packaged in the application program, and
   wherein each component defines a particular process to be performed,
   loading the scripts from outside of the smart card via the input/output interface into the smart card after the smart card has been issued.

2. The method of loading scripts into a smart card according to claim 1, wherein the scripts are installed into the smart card after the application program is installed into the smart card.

3. The method of loading scripts into a smart card according to claim 1, wherein the scripts are stored into the storage means through the input/output interface after the application program is loaded.

4. The method of loading scripts into a smart card according to claim 1, wherein a first script is installed into the smart card after the application program is installed into the smart card and a second script that is different from the first script is installed into the smart card.

5. The method of loading scripts into a smart card according to claim 1, wherein processing defined in the scripts can generate different results, according to an input by the user of the smart card and the timing of execution thereof, and the user cannot predict the result of processing in advance.

6. The method of loading scripts into a smart card according to claim 1, wherein a predetermined authentication procedure is carried out to assure that valid scripts, free of falsity, are stored when the scripts are stored into the storage means through the input/output interface after the application program is loaded.

7. The method of loading scripts into a smart card according to claim 1, wherein the scripts define a game and by execution of a suite of scripts by using the smart card on which the suite of scripts has been installed, the game defined in the suite of scripts can be executed.

8. The method of loading scripts into a smart card according to claim 1, wherein the scripts define a game, points may be added, according to the result of executing the game, and the accumulated points are retained in the smart card.

9. A method of loading scripts into a smart card, having storage means, an input/output interface, and an application program that can run under an operating system (OS) installed on the smart card, said method comprising:
wherein said application program includes an interpreter for interpreting and executing scripts which describe and define a sequence of procedures to be run by the application program,
loading the scripts from outside of the smart card via the input/output interface into the smart card after the smart card has been issued, and
wherein the application program is configured such that common process components as a set of a plurality of processing modules each of which outputs a given result in response to a given command are packaged inside the application program in order that the processing modules in the common process components are selectively called when the scripts are interpreted and executed.

10. A method of loading scripts into a smart card having storage means, an input/output interface, and an application program that can run under an operating system (OS) installed on the smart card, said method comprising:
wherein said application program includes an interpreter for interpreting and executing scripts which describe and define a sequence of procedures to be run by the application program,
loading the scripts from outside of the smart card via the input/output interface into the smart card after the smart card has been issued, and
following execution of processing defined in the scripts, invalidating those scripts and making the processing impossible to do.

11. A method of loading scripts into a smart card having storage means, an input/output interface, and an application program that can run under an operating system (OS) installed on the smart card, said method comprising:
wherein said application program includes an interpreter for interpreting and executing scripts which describe and define a sequence of procedures to be run by the application program,
loading the scripts from outside of the smart card via the input/output interface into the smart card after the smart card has been issued,
wherein said smart card further includes storage for rights to execute that stores rights to execute scripts, defining the maximum number of times the processing defined in the scripts can be executed, and a function that, immediately following the execution of processing defined in the scripts, decrements the count of the rights to execute those scripts by one.

12. A method of loading scripts into a smart card having storage means, an input/output interface, and an application program that can run under an operating system (OS) installed on the smart card, said method comprising:
wherein said application program includes an interpreter for interpreting and executing scripts which describe and define a sequence of procedures to be run by the application program,
loading the scripts from outside of the smart card via the input/output interface into the smart card after the smart card has been issued,
wherein the scripts define a game, the game can be executed only if rights to play the game are given to the card user, and the rights to play the game defines the number of times a type of game can be executed and said rights are stored into the smart card when the game is issued.

13. A method of loading scripts into a smart card having storage means, an input/output interface, and an application program that can run under an operating system (OS) installed on the smart card, said method comprising:
wherein said application program includes an interpreter for interpreting and executing scripts which describe and define a sequence of procedures to be run by the application program,
loading the scripts from outside of the smart card via the input/output interface into the smart card after the smart card has been issued,
wherein data of the rights to play a game can be stored separately from the scripts or the rights to play a game can be included in the scripts,
wherein in the case where the rights are included in the scripts, the rights to play will be lost following the execution of the game.

14. A method of loading scripts into a smart card having storage means, an input/output interface, and an application program that can run under an operating system (OS) installed on the smart card, said method comprising:
wherein said application program includes an interpreter for interpreting and executing scripts which describe and define a sequence of procedures to be run by the application program,
loading the scripts from outside of the smart card via the input/output interface into the smart card after the smart card has been issued,
wherein the data of rights to play a game includes the script issuer that offers the point service, the type of game playable, and the count of games that the user can play with that game.

15. A method of loading scripts into a smart card having storage means, an input/output interface, and an application program that can run under an operating system (OS) installed on the smart card, said method comprising:

- wherein said application program includes an interpreter for interpreting and executing scripts which describe and define a sequence of procedures to be run by the application program,
- loading the scripts from outside of the smart card via the input/output interface into the smart card after the smart card has been issued,
- wherein the point data is stored per script issuer that offers the point service.

16. A method of loading scripts into a smart card having storage means, an input/output interface, and an application program, said method comprising:

- loading the scripts as part of the application program from outside of the smart card via the input/output interface into the smart card after the smart card has been issued,
- wherein the application program can run under an operating system (OS) installed on the smart card and includes an interpreter for interpreting and executing the scripts which describe and define a sequence of executing components which are packaged in the application program,
- wherein each component defines a particular process to be performed, and
- wherein the application program is stored in the storage means.

* * * * *